(12) United States Patent
Takei et al.

(10) Patent No.: US 9,881,605 B2
(45) Date of Patent: Jan. 30, 2018

(54) IN-VEHICLE CONTROL APPARATUS AND IN-VEHICLE CONTROL METHOD

(71) Applicant: Mitsubishi Electric Corporation, Tokyo (JP)

(72) Inventors: Takumi Takei, Tokyo (JP); Taro Kumagai, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 0 days.

(21) Appl. No.: 15/111,236

(22) PCT Filed: Feb. 26, 2014

(86) PCT No.: PCT/JP2014/054669
§ 371 (c)(1),
(2) Date: Jul. 13, 2016

(87) PCT Pub. No.: WO2015/128960
PCT Pub. Date: Sep. 3, 2015

(65) Prior Publication Data
US 2016/0336009 A1 Nov. 17, 2016

(51) Int. Cl.
*G10L 15/22* (2006.01)
*G06F 3/041* (2006.01)
(Continued)

(52) U.S. Cl.
CPC .............. *G10L 15/22* (2013.01); *B60K 35/00* (2013.01); *B60R 16/0373* (2013.01);
(Continued)

(58) Field of Classification Search
CPC ......... G10L 21/06; G10L 15/22; G06F 17/20; G06F 3/041
(Continued)

(56) References Cited

U.S. PATENT DOCUMENTS 6,076,061 A 6/2000 Kawasaki et al.
6,219,645 B1 * 4/2001 Byers ...................... G10L 15/02
381/91

(Continued)

FOREIGN PATENT DOCUMENTS

JP 4-372012 A 12/1992
JP 8-83093 A 3/1996
(Continued)

*Primary Examiner* — Seong Ah A Shin
(74) *Attorney, Agent, or Firm* — Birch, Stewart, Kolasch & Birch, LLP

(57) ABSTRACT

According to an in-vehicle control apparatus, it is configured to receive information of a plurality of operation keys displayed on a display, to identify from a result of voice recognition of a user's speech, the operation key corresponding thereto on the basis of the information of the operation keys, and to execute a function assigned to the operation key upon receiving an instruction for execution by the user using a decision key, so that it is possible to perform an operation without making contact directly with the plurality of operation keys displayed on the display and without the need of a complex key operation. Further, solely by mounting just one decision key on a steering wheel, it becomes possible to safely perform the operation about the operation key displayed on the display without the user releasing his/her hand from the steering wheel during driving.

9 Claims, 20 Drawing Sheets

(51) Int. Cl.
- *G10L 21/06* (2013.01)
- *G06F 17/20* (2006.01)
- *B60R 16/037* (2006.01)
- *B60K 35/00* (2006.01)
- *G06F 3/16* (2006.01)
- *G10L 15/06* (2013.01)
- *G10L 15/08* (2006.01)

(52) U.S. Cl.
CPC .............. *G06F 3/167* (2013.01); *G10L 15/06* (2013.01); *B60K 2350/1044* (2013.01); *G10L 2015/088* (2013.01); *G10L 2015/223* (2013.01)

(58) Field of Classification Search
USPC ............ 704/231, 240, 275; 345/173; 381/91
See application file for complete search history.

(56) References Cited

U.S. PATENT DOCUMENTS

| | | | | |
|---|---|---|---|---|
| 6,728,546 | B1* | 4/2004 | Peterson | H04M 1/2473 455/462 |
| 2002/0059067 | A1* | 5/2002 | Ono | G10L 15/22 704/240 |
| 2002/0128762 | A1 | 9/2002 | Noguchi et al. | |
| 2005/0182627 | A1* | 8/2005 | Tanaka | G11B 20/00007 704/248 |
| 2006/0074666 | A1* | 4/2006 | Chung | G06N 5/047 704/257 |
| 2006/0224386 | A1* | 10/2006 | Ikegami | G10L 13/00 704/260 |
| 2007/0033419 | A1* | 2/2007 | Kocher | G06F 21/10 713/193 |
| 2007/0101290 | A1* | 5/2007 | Nakashima | G01C 21/265 715/797 |
| 2013/0179173 | A1* | 7/2013 | Lee | G10L 15/22 704/275 |
| 2013/0254841 | A1* | 9/2013 | Venkatesan | G06F 21/85 726/3 |
| 2013/0339027 | A1* | 12/2013 | Dokor | G06F 17/20 704/275 |
| 2014/0022184 | A1* | 1/2014 | Bathiche | G10L 15/24 345/173 |
| 2014/0108019 | A1* | 4/2014 | Ehsani | G10L 21/06 704/275 |
| 2014/0114665 | A1* | 4/2014 | Murgia | G10L 21/0216 704/275 |

FOREIGN PATENT DOCUMENTS

| | | |
|---|---|---|
| JP | 11-65592 A | 3/1999 |
| JP | 11-282491 A | 10/1999 |
| JP | 2002-12100 A | 1/2002 |
| JP | 2002-116791 A | 4/2002 |
| JP | 2003-291750 A | 10/2003 |
| JP | 2008-145989 A | 6/2008 |
| JP | 2011-2535 A | 1/2011 |
| JP | 2013-88535 A | 5/2013 |

* cited by examiner

FIG.4

| Operation Key | Recognition Keyword | Execution Command |
|---|---|---|
| Playback | Playback | 0001 |
| Stop | Stop | 0010 |
| Next Song | Next Song | 0011 |
| Previous Song | Previous Song | 0100 |

FIG.10
(a) 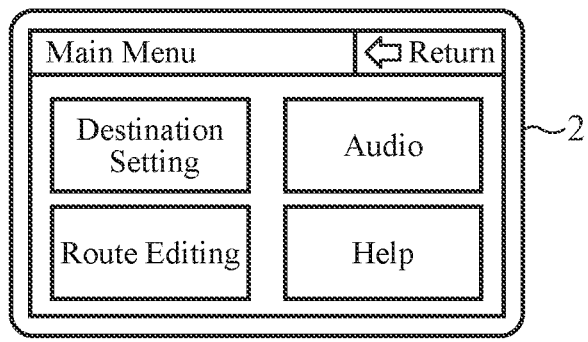
(b) 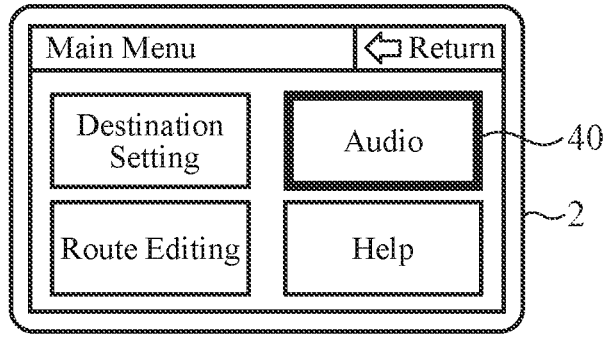
(c) 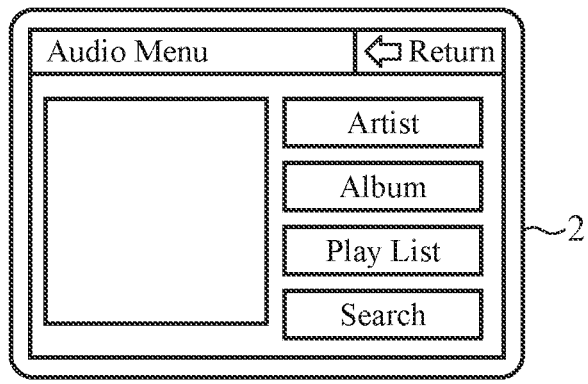

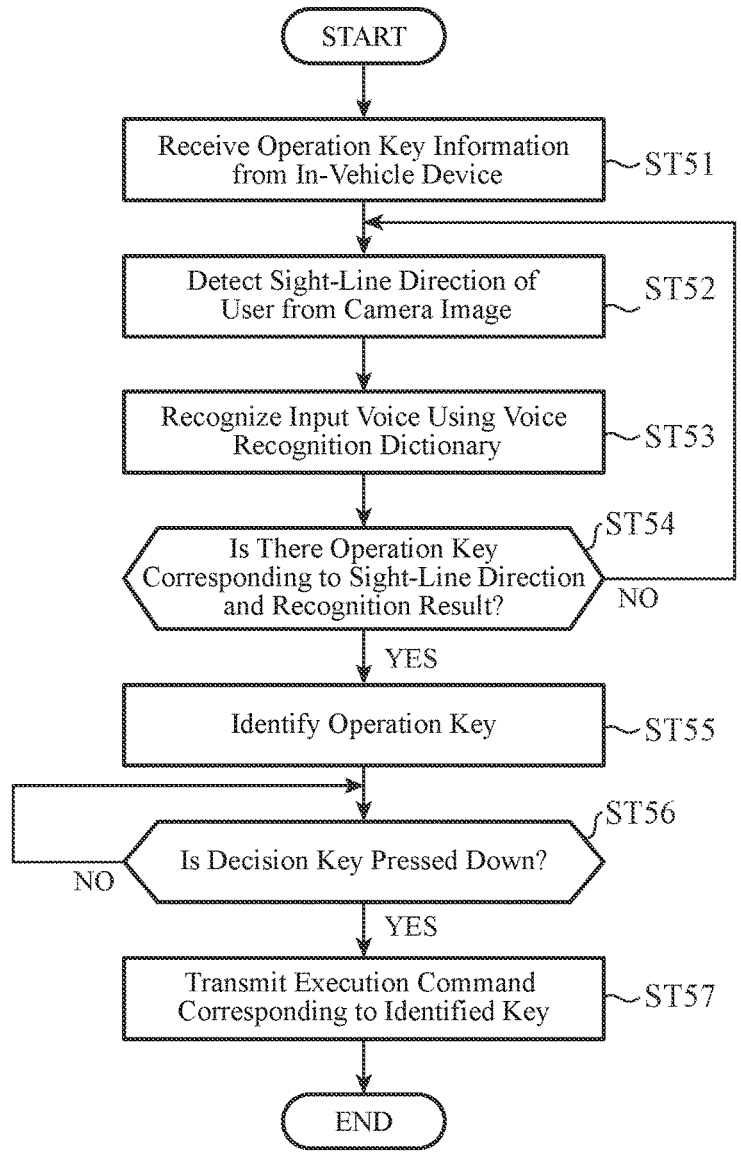

IN-VEHICLE CONTROL APPARATUS AND IN-VEHICLE CONTROL METHOD

TECHNICAL FIELD

The present invention relates to an in-vehicle control apparatus and an in-vehicle control method which give an instruction for execution of a function assigned to an operation key that is displayed on a display connected to an in-vehicle device.

BACKGROUND ART

Heretofore, in a usual in-vehicle information device such as a car-navigation device or the like, in order to execute a function assigned to any one of operation keys displayed on a display connected to that device, an operation is performed in such a manner that the operation key displayed on a screen of the display is identified using a touch panel, physical keys corresponding to the respective operation keys, or an operation device such as a rotary switch, a cross key or the like.

Accordingly, there is a problem that, in the case where the operation is performed using, for example, the touch panel, this causes the user to release his/her hand from the steering wheel, thus making it difficult to perform the operation during driving and further causing trouble in driving.

Meanwhile, in the case of the physical keys, the number of the physical keys increases in proportion to the number of the operation keys, so that there is a problem that, when the number of the operation keys is large, it is difficult to arrange all the physical keys corresponding to the operation keys on the steering wheel.

Further, although it is not impossible to arrange the rotary switch or the cross key on the steering wheel, such a relatively large device is undesirable to be arranged in such a limited arrangement space, and there is a problem that, in order to identify each of the operation keys, a complex operation becomes necessary as the number of the operation keys displayed on the display increases, thus making it difficult to perform the operation during driving and further causing trouble in driving.

As a measure to solve such a problem, there is disclosed, for example, in Patent Document 1, a technology which provides a vehicle control apparatus that allows the driver to control an in-vehicle control system without releasing his/her hand from the steering wheel when operating a transmission control device for an automatic transmission or any of vehicle-mounted devices.

CITATION LIST

Patent Document

Patent Document 1: Japanese Patent Application Laid-open No. H08-83093

SUMMARY OF THE INVENTION

Problems to be Solved by the Invention

However, according to the conventional technology as, for example, in Patent Document 1, with respect to a plurality of operation keys displayed on the display, there are many cases where the number of the operation keys becomes vast and where the operation key that is executable differs depending on a situation at each time or a display content. Thus, when the invention of Patent Document 1 is just applied without change, there may be a case where it is difficult to provide sufficient operability for the user.

Specifically, when the number of the operation keys is vast, it is difficult for the user to keep in mind the control commands corresponding to all the operation keys; at the same time, as a problem in voice recognition technology, there is a problem that, though depending on a user's speaking condition or a surrounding environment, a voice recognition accuracy becomes lower as the number of the standby control commands increases. Further, because the objects to be controlled are increased, ambiguity will not be allowed about the input voice contents for the respective control commands acceptable at the same time, so that there is also a problem that a necessity generally arises for the user to remember longer words as the control commands.

For example, in an audio-integrated car-navigation device, just by the control command of "to large", it is ambiguous whether it means [to enlarge the map screen] or [to set the audio volume up], so that it is needed to speak "to make large the map", "to increase the audio volume" or the like. Further, with respect to an operation that is acceptable only under a particular condition, even if the user remembers its control command, there is a risk that the user becomes confused because of not knowing in what situation he/she should speak it.

This invention has been made to solve the problems as described above, and an object thereof is to provide an in-vehicle control apparatus and an in-vehicle control method by which, in the case of operating each of the plurality of operation keys displayed on a display connected to an in-vehicle device, it is possible to make it easy to perform the operation during driving and not to cause trouble in driving, and further to provide an acceptable operation and the corresponding control command to the user in an easy-to-understand manner depending on a display content.

Means for Solving the Problems

In order to accomplish the above object, the invention is characterized by an in-vehicle control apparatus for controlling an in-vehicle device mounted on a vehicle, which comprises: a key information receiver that receives information of a plurality of operation keys displayed on a display connected to the in-vehicle device, dynamically in response to a change in display content displayed on the display; a voice recognizer that recognizes a voice spoken by a user, using a voice recognition dictionary; an operation key identifier that identifies the operation key corresponding to the voice spoken by the user, on the basis of the information of the operation keys received by the key information receiver and a voice recognition result by the voice recognizer; and a controller that receives from a decision key, an output for selecting the operation key identified by the operation key identifier, to thereby give an instruction to the in-vehicle device for causing it to execute a function assigned to the thus-identified operation key.

Effect of the Invention

According to the in-vehicle control apparatus of the invention, it becomes possible to perform the operation without making contact directly with the plurality of operation keys displayed on the display and without the need of a complex key operation. Further, solely by mounting just one decision key on the steering wheel, it becomes possible to safely perform the operation about the operation key displayed on the display without the user releasing his/her hand from the steering wheel during driving.

BRIEF DESCRIPTION OF THE DRAWINGS

FIG. 4 is a table showing an example of operation key information (recognition keywords and execution commands corresponding to the respective operation keys) in the case of FIG. 3.

FIG. 10 is a diagram showing an example of a transition from a menu screen in which a plurality of operation keys is displayed on a display screen of a display, according to Embodiment 2.

FIG. 21 is a flowchart showing operations of the in-vehicle control apparatus according to Embodiment 6.

FIG. 22 is a table showing an example of operation key information (recognition keywords, execution commands and coordinate information corresponding to the respective operation keys) according to Embodiment 6.

MODES FOR CARRYING OUT THE INVENTION

Hereinafter, embodiments of the invention will be described in detail with reference to the drawings.

The invention serves in an in-vehicle control apparatus which controls using a user's operation, a variety of in-vehicle devices mounted on a vehicle, to perform operation of each of a plurality of operation keys displayed on a display connected to the in-vehicle devices using voice recognition and a single decision key.

Embodiment 1

Figure 1:
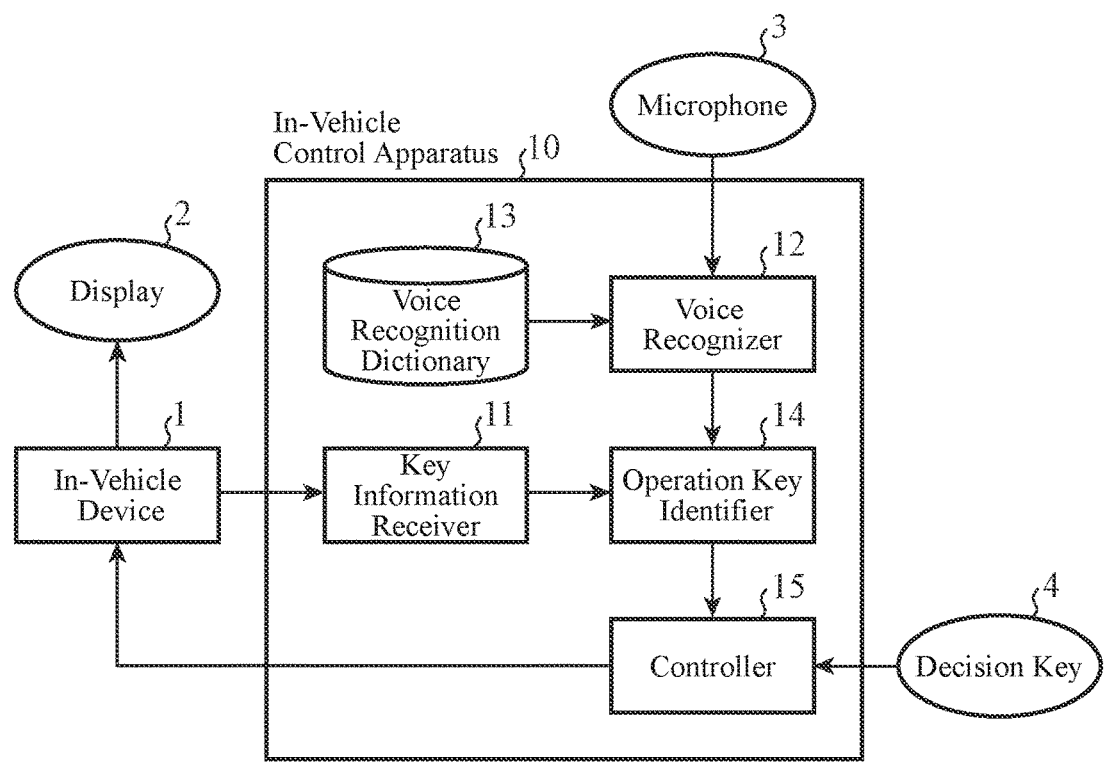
FIG. 1 is a block diagram showing an example of an in-vehicle control apparatus according to Embodiment 1.

FIG. 1 is a block diagram showing an example of an in-vehicle control apparatus according to Embodiment 1 of the invention. The in-vehicle control apparatus 10 is connected to an in-vehicle device 1 provided as an object to be controlled, and includes a key information receiver 11, a voice recognizer 12, a voice recognition dictionary 13, an operation key identifier 14 and a controller 15, so that the in-vehicle device 1 and the in-vehicle control apparatus 10 works together to perform operation control of the in-vehicle device 1. Further, a microphone 3 and a single decision key 4 are connected to the in-vehicle control apparatus 10, and a display 2 is connected to the in-vehicle device 1.

Note that, the in-vehicle device 1 connected to the in-vehicle control apparatus 10, may be any device so far as it is associated with displaying and operation, such as a display having an operation control function, a device having the display, a device connected to the display, or the like, as exemplified by a car-navigation device, an HUD (Head-Up Display), an instrument panel and the like. The in-vehicle control apparatus 10 may itself be incorporated in such a device. The connected configuration may be by wire or may be wireless such as by Bluetooth (registered trademark) or Wi-Fi (registered trademark), and may be configured with a server on a network.

Further, although the decision key 4 is herein described as an H/W switch mounted on a steering wheel (handle) of a vehicle, its mounted place and switch configuration are not limited thereto, and the switch may be any one so far as for execution of a decided operation. Further, though omitted from the diagram, it is allowable to configure so that: such an operation control of the in-vehicle device 1 can be made by an operation using together with a conventional operation device, such as a touch panel, an H/W switch, a rotary switch, a cross key, a remote controller or the like; a plurality of in-vehicle devices is connected to the in-vehicle control apparatus 10; and the microphone 3 and the single decision key 4 are connected to the side of the in-vehicle device 1. The same also applies to the following embodiments.

The in-vehicle device 1 transmits the information of the operation keys displayed on the display 2 to the in-vehicle control apparatus 10, receives an execution command corresponding to any one of the operation keys from the in-vehicle control apparatus 10, and executes a function corresponding (assigned) to that operation key. The "function corresponding (assigned) to that operation key" means a function that is executed when that operation key is selected, such as, for example, a transition to a prescribed screen, a music playback, or the like.

Further, the operation keys displayed on the display 2 are not limited to operation keys that are being displayed exactly on the display 2, and may include that which is to be displayed by way of a specified operation, such as, for example, a screen scrolling, a screen reduction/enlargement or a display/non-display switching, when and because they do not fall within the display area of the display 2.

Note that the same also applies to the following embodiments.

The key information receiver 11 receives from the in-vehicle device 1 connected thereto, the information of a plurality of operation keys displayed on the display 2 connected to the in-vehicle device 1. Although specific examples of the operation key information will be described later, the key information receiver receives it dynamically in response to a change in display content displayed on the display 2. Namely, in response to the display content displayed on the display 2 changing dynamically, the operation key information to be received changes dynamically.

The voice recognizer 12 has the voice recognition dictionary 13, and performs A/D conversion of the sound (voice spoken by the user) collected by the microphone 3, etc., to thereby acquire it in a PCM (Pulse Code Modulation) format, for example, and then collates the feature quantity of the voice with the voice recognition dictionary 13 to thereby perform voice recognition processing. Here, the voice recognition processing may be performed using a typical method, such as, for example, by a Hidden Markov Model. Further, as the voice recognizer 12, a voice recognition server on a network may be used.

Here, the voice recognition dictionary 13 is so configured to allow recognition of a keyword, etc. used for key identification processing in the operation key identifier 14 to be described later, and the voice recognizer 12 outputs the keyword (hereinafter, referred to as "recognition keyword") included in the speech as a voice recognition result.

Meanwhile, with respect to voice recognition functions installed in car-navigation systems and the like, it is general that the user specifies (indicates) a start of speech, etc. to the system. For that purpose, a button, etc. for indicating a start of voice recognition (hereinafter, referred to as "voice-recognition-start indicator") is displayed on a touch panel or mounted on a steering wheel. Then, the voice is recognized that is spoken after the speech-recognition-start indicator is pressed down by the user. Namely, the voice-recognition-start indicator outputs a voice-recognition-start signal, and, upon receiving that signal, the voice recognizer waits to receive a speech of the user, followed by performing the above-described recognition processing.

However, the voice recognizer 12 in Embodiment 1 constantly recognizes the spoken content of the user even without the indication to start voice recognition by the user as described above. Namely, even though not receiving the voice-recognition-start signal, the voice recognizer 12 performs recognition processing using the recognition dictionary to thereby repeatedly perform processing to output a keyword included in the voice recognition result. Further, in the above description, the spoken content of the user is recognized constantly; however, in order to suppress the usage of a CPU, a memory or the like, it is allowable to perform recognition processing only when the sound inputted through the microphone can be determined as a voice on the basis of a feature of the input voice (for example, a volume of the input sound, etc.). The same also applies to the following embodiments.

The operation key identifier 14 identifies the operation key corresponding to the voice spoken by the user, on the basis of the operation key information received by the key information receiver 11 and the voice recognition result by the voice recognizer 12. Specifically, it refers to the operation key information acquired by the operation key receiver 11 to thereby identify the execution command of the operation key corresponding to the recognition keyword acquired from the voice recognizer 12.

The controller 15, upon receiving from the decision key 4 an output for selecting any one of the operation keys identified by the operation key identifier 14, transmits the execution command corresponding to the identified operation key to the in-vehicle device 1, to thereby instruct the in-vehicle device 1 to execute the function assigned to that operation key. The execution command may be in any form so far as it can uniquely identify the operation key in line with a predefined rule, such as, for example, an ID by a number string or a character string, a pattern of electric signals, a name of the operation key, or the like. The same also applies to the following embodiments.

Next, operations of the thus-configured in-vehicle control apparatus 10 according to Embodiment 1 will be described specifically with reference to FIG. 2. Here, it is presumed that the in-vehicle device 1 to be connected is an audio-integrated car-navigation device.

First, the key information receiver 11 receives from the car-navigation device (in-vehicle device 1) connected thereto, the information of the operation keys displayed on the display 2 (Step ST1). For example, as shown in FIG. 3, when four operation keys of [Playback], [Stop], [Next Song] and [Previous Song] are assumed to be displayed on the display screen of the display 2, information of sets of at least one recognition keyword and an execution command corresponding to the respective operation keys is given as the operation key information as shown in FIG. 4.

Figure 3:
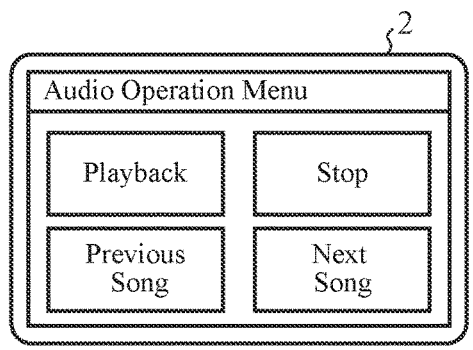
FIG. 3 is a diagram showing an example of a menu screen in which a plurality of operation keys is displayed on a display screen of a display, according to Embodiment 1.

Here, FIG. 3 is a diagram showing an example of a menu screen in which a plurality of operation keys is displayed on a display screen of the display 2, according to Embodiment 1. Further, FIG. 4 is a table showing an example of the operation key information (recognition keywords and execution commands corresponding to the respective operation keys) in the case of FIG. 3. In this case, the operation key [Playback] has a recognition keyword of "playback" and an execution command code of "0001"; the operation key [Stop] has a recognition keyword of "stop" and an execution command code of "0010"; the operation key [Next Song] has a recognition keyword of "next song" and an execution command code of "0011"; and the operation key [Previous Song] has a recognition keyword of "previous song" and an execution command code of "0100".

Thereafter, the voice recognizer 12 performs voice recognition from the voice signal inputted through the microphone 3 using the voice recognition dictionary 13, and outputs the recognition keyword included in the speech (Step ST2). For example, in the case where "playback" is defined in the voice recognition dictionary 13 as a recognition keyword, when the user speaks, for example, "well, 'playback'", then "recognition keyword='playback'" is outputted.

Next, using the recognition keyword acquired from the voice recognizer 12, the operation key identifier 14 refers to the operation key information acquired from the key information receiver 11, to thereby judge whether the operation key corresponding to the voice recognition result is present or not (Step ST3). Specifically, it judges whether the operation key matched to the recognition keyword that is the voice recognition result, is present or not.

Then, if the operation key corresponding to the voice recognition result (recognition keyword) is not present in the operation key information (in the case of NO in Step ST3), the flow returns to Step ST2, so that the voice recognition processing is performed again by the voice recognizer 12.

In contrast, if the operation key corresponding to the voice recognition result is present, namely, the operation key matched to the recognition keyword is present (in the case of YES in Step ST3), the operation key matched to the recognition keyword is identified (Step ST4), and the execution command corresponding to that operation key is sent to the controller 15. For example, in the case of "recognition keyword='playback'", it is identified that "operation key='playback'", and its corresponding "execution command='0001'" is sent to the controller 15.

The controller 15, when detects pressing-down of the single decision key 4 connected to the in-vehicle control apparatus 10 (in the case of YES in Step ST5), transmits the execution command sent from the operation key identifier 14, to the in-vehicle device 1 connected to the in-vehicle control apparatus 10 (Step ST6), so that the in-vehicle device 1 executes the corresponding function. For example, "execution command='0001'" corresponding to "operation key='playback'" is transmitted from the in-vehicle control apparatus 10 to the in-vehicle device 1, so that the in-vehicle device 1 executes, for example, playback of music as a function corresponding to "execution command='0001'".

Here, the key information receiver 11 is that which receives the information of the operation keys dynamically in response to a change in display content of the display 2. About this, description will be made with reference to FIG. 5.

Figure 5:
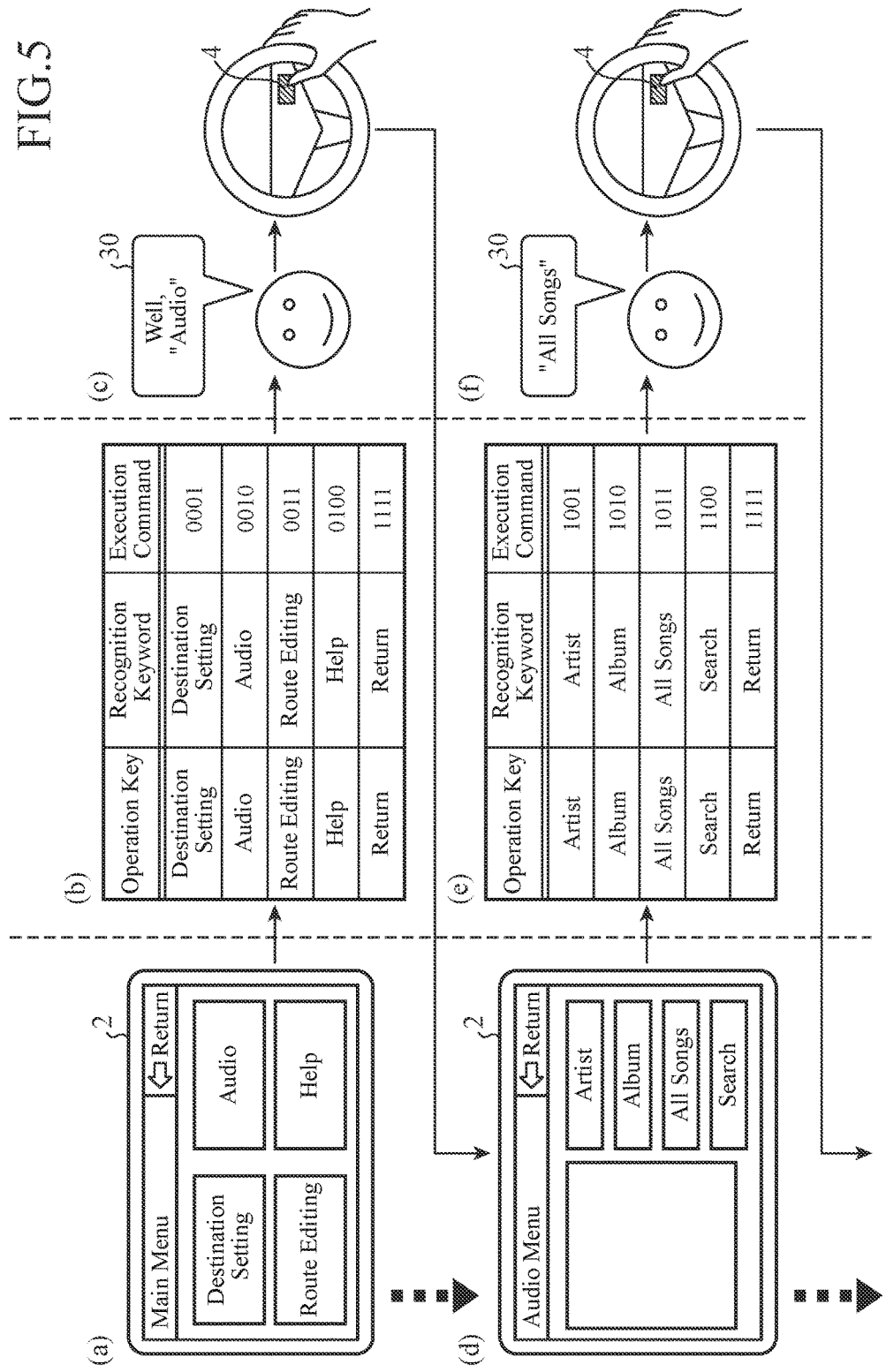
FIG. 5 is an illustration diagram showing specific examples of an operation of a car-navigation device (in-vehicle device), a display content of its display, operation key information and a user's operation.

FIG. 5 is an illustration diagram showing specific examples of an operation of the car-navigation device (in-vehicle device 1), a display content of the display 2, the operation key information and a user's operation.

As shown at FIG. 5(*a*), it is assumed that a main menu having five operation keys of [Destination Setting], [Audio], [Route Editing], [Help] and [Return] is displayed on the display 2. In this case, the operation key information to be received by the key information receiver 11 is as shown at FIG. 5(*b*).

In this state and in the case, for example, where the user wants to playback music, when the user speaks "well, 'audio'" and presses down the decision key 4 as shown at FIG. 5(*c*), an audio menu screen is displayed on the display 2 as shown at FIG. 5(*d*) (screen is transited to the audio menu screen).

In the audio menu screen shown at FIG. 5(*d*), five operation keys of [Artist], [Album], [All Songs], [Search] and [Return] are displayed. In this case, the operation key information to be received by the key information receiver 11 is as shown at FIG. 5(*e*).

In this state, when, for example, the user speaks "'all songs'" and presses down the decision key 4 as shown at FIG. 5(*f*), a list screen of all songs is displayed on the display 2 (screen is transited to the list screen of all songs).

Thereafter, though omitted from the diagram, it suffices to operate in such a flow that, subsequently and furthermore, the user speaks "'XXXX' (a song title in the list)" and presses down the decision key 4, so that the song of XXXX is played back and an audio operation screen as previously described is displayed.

Note that the reference numeral 30 shown in FIGS. 5(*c*) and (*f*) indicates the speech of the user (spoken content).

As described above, according to Embodiment 1, it becomes possible to perform the operation without making contact directly with the plurality of operation keys displayed on the display and without the need of a complex key operation. Further, solely by mounting just one decision key on the steering wheel, it becomes possible to safely perform the operation about the operation key displayed on the display without the user releasing his/her hand from the steering wheel during driving.

Further, it is possible to perform the operation that is dynamically responsive also to the in-vehicle device having a UI (User interface) in which transition is made between hierarchical screens or to a display of the operation key which is partly overlapping, or to be added, in the display area. Namely, because the operation key information is received dynamically in response to a change in display content of the display, it is possible to dynamically follow a change, if any, in the displayed operation key, or to perform the operation that is responsive also to pop-up like notice.

Figure 6:
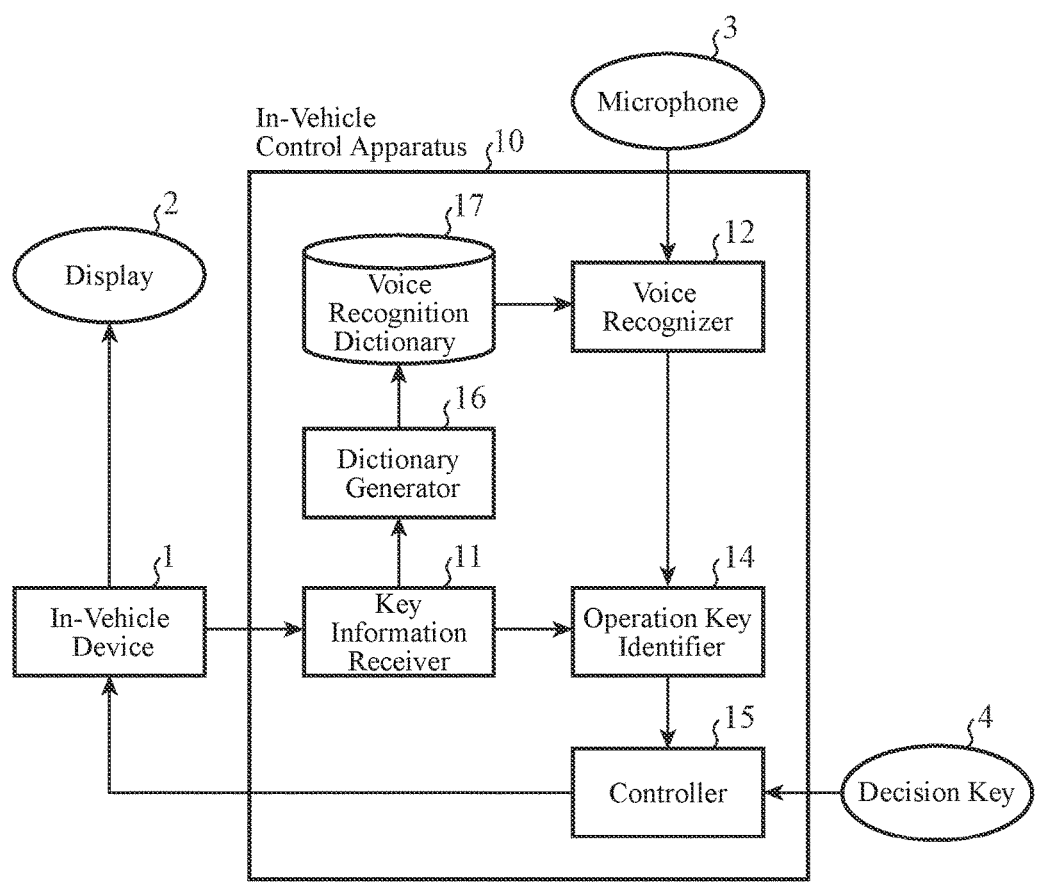
FIG. 6 is a block diagram showing another example of the in-vehicle control apparatus according to Embodiment 1.

Meanwhile, as shown in FIG. 6, it is allowable that the in-vehicle control apparatus 10 further includes a dictionary generator 16 that generates the dictionary at least from words (recognition keywords) corresponding to the operation keys displayed on the display 2, on the basis of the information of the displayed operation keys, so that the voice recognizer 12 recognizes the voice spoken by the user, using the voice recognition dictionary 17 generated by the dictionary generator 16.

At the time of generating the voice recognition dictionary 17, although information reading phonemes or like becomes necessary for recognizing the voice, such information may be embedded in the operation key information in a corresponding manner to each recognition keyword, or the reading information may be given or estimated by morphological analysis processing, etc. from text information such as operation key names in the operation key information, information of the recognition keywords or the like. Here, the morphological analysis processing may be performed using a typical method, such as, by a Hidden Markov Model that is also used in the aforementioned voice recognition processing.

When thus configured, the voice recognition dictionary 17 is generated responsive to each time the display content dynamically changes, so that required number of the words subject to voice recognition can be kept to minimum. Thus, it is possible to prevent false recognition of the word irrelevant to an operation, or to reduce the time necessary for voice recognition, so that the voice recognition performance (accuracy, response speed, etc.) can be improved and thus the user can perform a comfortable operation.

Figure 7:
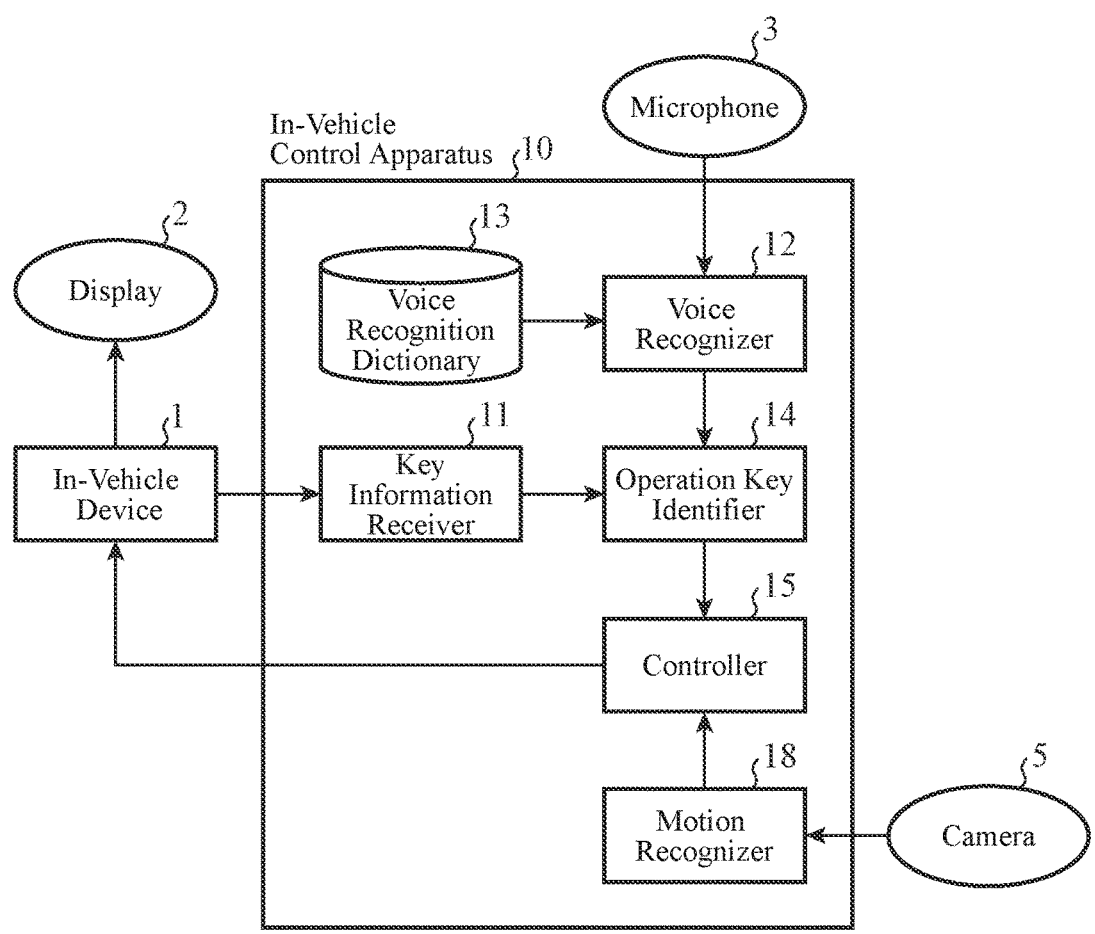
FIG. 7 is a block diagram showing still another example of the in-vehicle control apparatus according to Embodiment 1.

Further, as shown in FIG. 7, it is allowable that the in-vehicle control apparatus 10 further includes, but instead of the decision key 4, a motion recognizer 18 that recognizes a body motion of the user, so that, when the body motion of the user that shows an intention to cause an execution, such as, for example, a nod or a wink, is recognized by the motion recognizer 18, the controller 15 gives the instruction for causing the execution of the function assigned to the identified operation key.

The recognition processing of the body motion by the motion recognizer 18 may be performed using a typical pattern recognition by use of a camera 5, and the detection of a nod may be in such a manner that an acceleration sensor is worn on the head and when it senses a specified intensity in a specified direction, it is judged that the nodding has occurred.

When thus configured, it becomes unnecessary not only to have the decision key, but also to make the action (operation) to press down the decision key, so that any button operation becomes unnecessary. This results in no need to release the hand or the finger wholly from the steering wheel, so that the operation can be safely performed even during traveling.

Note that the in-vehicle control apparatus 10 is implemented by causing a microcomputer of the in-vehicle device 1 to which that apparatus is applied, to execute a program relevant to the processing specific to this invention, as a hardware-software cooperation substantial measure. The same also applies to the following embodiments.

Embodiment 2

Figure 8:
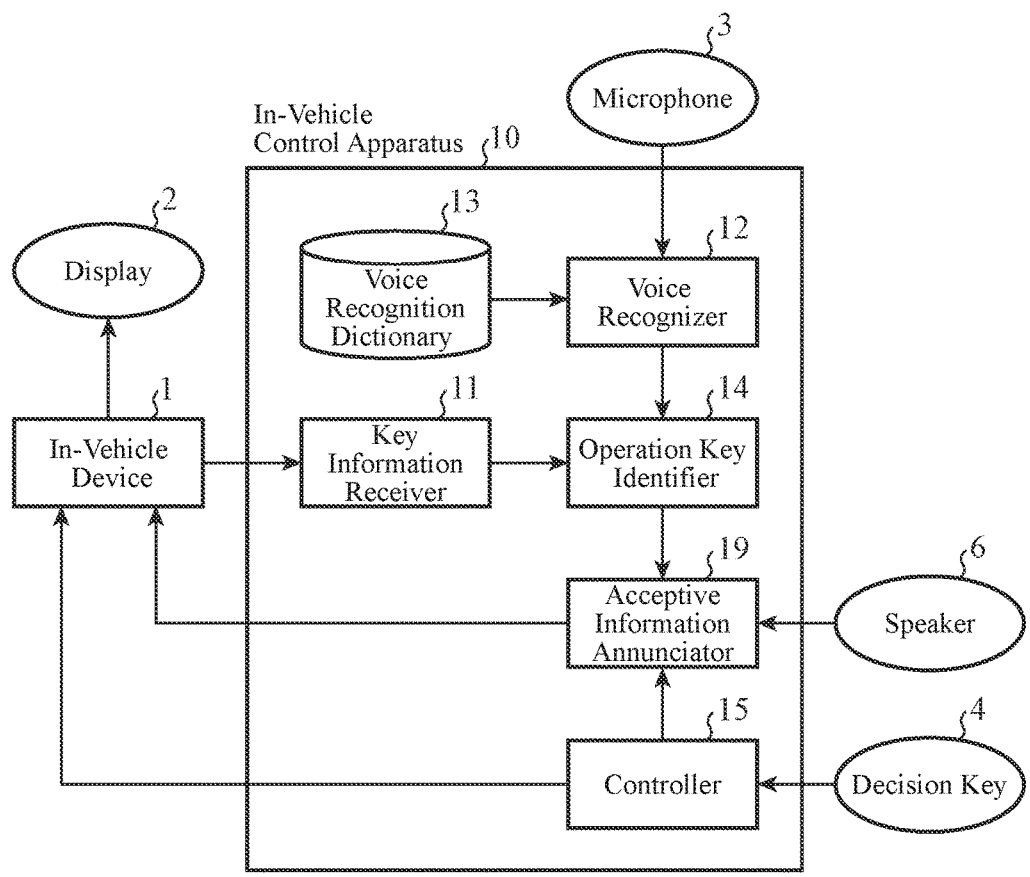
FIG. 8 is a block diagram showing an example of an in-vehicle control apparatus according to Embodiment 2.

FIG. 8 is a block diagram showing an example of an in-vehicle control apparatus according to Embodiment 2 of the invention. Note that, with respect to the components equivalent to those described in Embodiment 1, the same reference numerals are given thereto, so that duplicated description thereof is omitted.

In comparison to Embodiment 1, according to the in-vehicle control apparatus 10 of Embodiment 2 shown below, it further includes an acceptive information annunciator 19, so that, based on the identification result of the operation key by the operation key identifier 14, at least one of: a fact of starting to accept the instruction for execution with respect to the identified operation key; a fact of continuing to accept the instruction for execution; and the information of the identified operation key is announced through a speaker 6 or on the display 2 through the in-vehicle device 1. Note that, though omitted from the diagram, it is allowable to use, as that speaker, a speaker connected to the in-vehicle device 1.

Next, operations of the thus-configured in-vehicle control apparatus 10 according to Embodiment 2 will be described.

Figure 9:
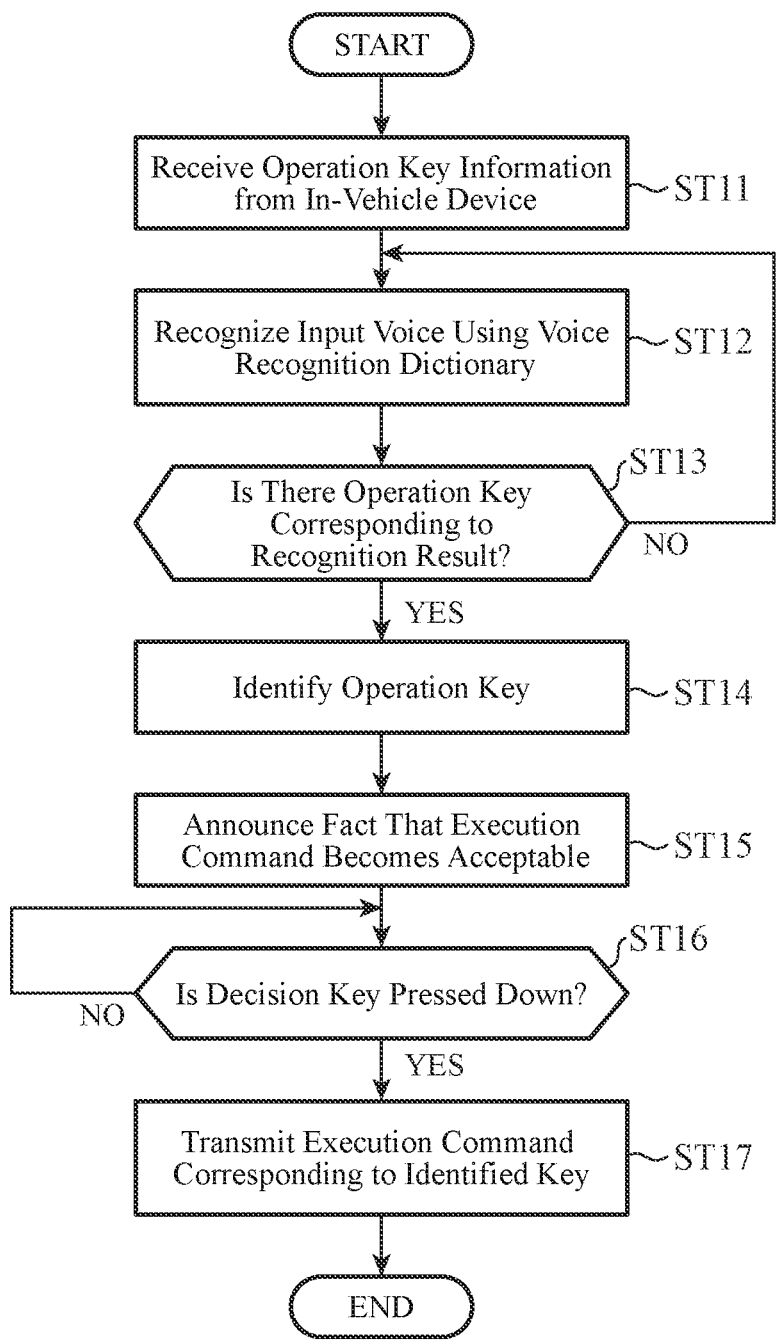
FIG. 9 is a flowchart showing operations of the in-vehicle control apparatus according to Embodiment 2.

FIG. 9 is a flowchart showing operations of the in-vehicle control apparatus 10 according to Embodiment 2. Even here, it is presumed, like Embodiment 1, that the in-vehicle device 1 to be connected is an audio-integrated car-navigation device.

Figure 2:
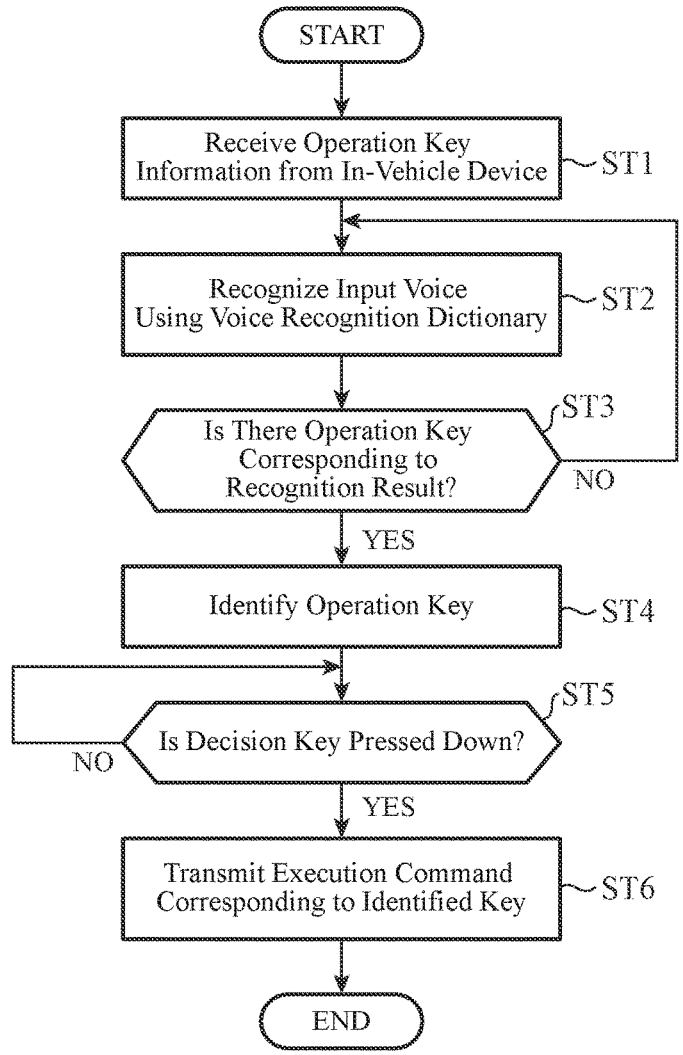
FIG. 2 is a flowchart showing operations of the in-vehicle control apparatus according to Embodiment 1.

The processing until the operation key is identified by the operation key identifier (Steps ST11 to ST14) is the same as that in Steps ST1 to ST4 in the flowchart shown in FIG. 2 in Embodiment 1, so that its description is omitted here.

Then, according to Embodiment 2, after the operation key identifier 14 identifies the operation key in Step ST14, the acceptive information annunciator 19 makes an announcement about: a fact that the operation key has been identified by the operation key identifier 14 and thus the instruction for execution with respect to the operation key becomes acceptable; information of the identified operation key and the like, namely at least one of: a fact of starting, upon identification of the operation key, to accept the instruction for execution with respect to the identified operation key; a fact of continuing to accept the instruction for that execution; and the information of the identified operation key (Step ST15).

Specifically, it is exemplified by the case where, upon receiving a result identified as, for example, "operation key='playback'", the annunciator makes a sound effect or plays music through the speaker 6 connected thereto, or changes brightness, color, etc. of the display screen of the display 2, to thereby announce the fact that the operation key has been identified and thus the instruction for execution about that operation key becomes acceptable.

Other than the above, in order to clearly inform the user of the identified operation key, it is allowable to read out the name, etc. of the operation key (for example, "playback") utilizing a recorded voice prepared for every operation key or a TTS (Text to Speech) technology based on voice synthesis. Further, it is allowable to give a visual effect to the operation key displayed on the display 2, for example, to light up the periphery of the identified operation key as shown at FIG. 10 (b), to display a graphic indicative of identification or to display an icon, near the selected operation key, or to change the brightness, the color, the shape, the size, or the like of the portion of the operation key.

FIG. 10 is a diagram showing an example of a transition from the menu screen in which a plurality of operation keys is displayed on the display screen of the display 2, according to Embodiment 2.

As shown at FIG. 10(a), it is assumed that a main menu having five operation keys of [Destination Setting], [Audio], [Route Editing], [Help] and [Return] is displayed on the display 2.

In this state and in the case, for example, where the user wants to playback music, when the user speaks "audio", as shown in FIG. 10(b), a highlighted indication 40 is added such as by surrounding only the operation key [Audio] with the frame, so that the user gets announced in a visually recognizable manner that the instruction for execution with respect to that operation key becomes acceptable.

Then, in this state, when the user presses down the decision key 4, five operation keys of [Artist], [Album"], [All Songs], [Search] and [Return] are displayed on the display 2 as shown at FIG. 10(c). The subsequent operations and screen transition are omitted from description.

As described above, according to Embodiment 2, at least one of the timing at which the instruction for execution becomes acceptable and the identified operation key, can be confirmed before giving the instruction for execution, so that it is possible to reduce: such a trouble that, before the operation key is identified, the instruction for execution is not accepted even if the decision key is pressed down; and an erroneous operation due to identification of the operation key different from the intended one (an operation different from the user's intention).

Figure 11:
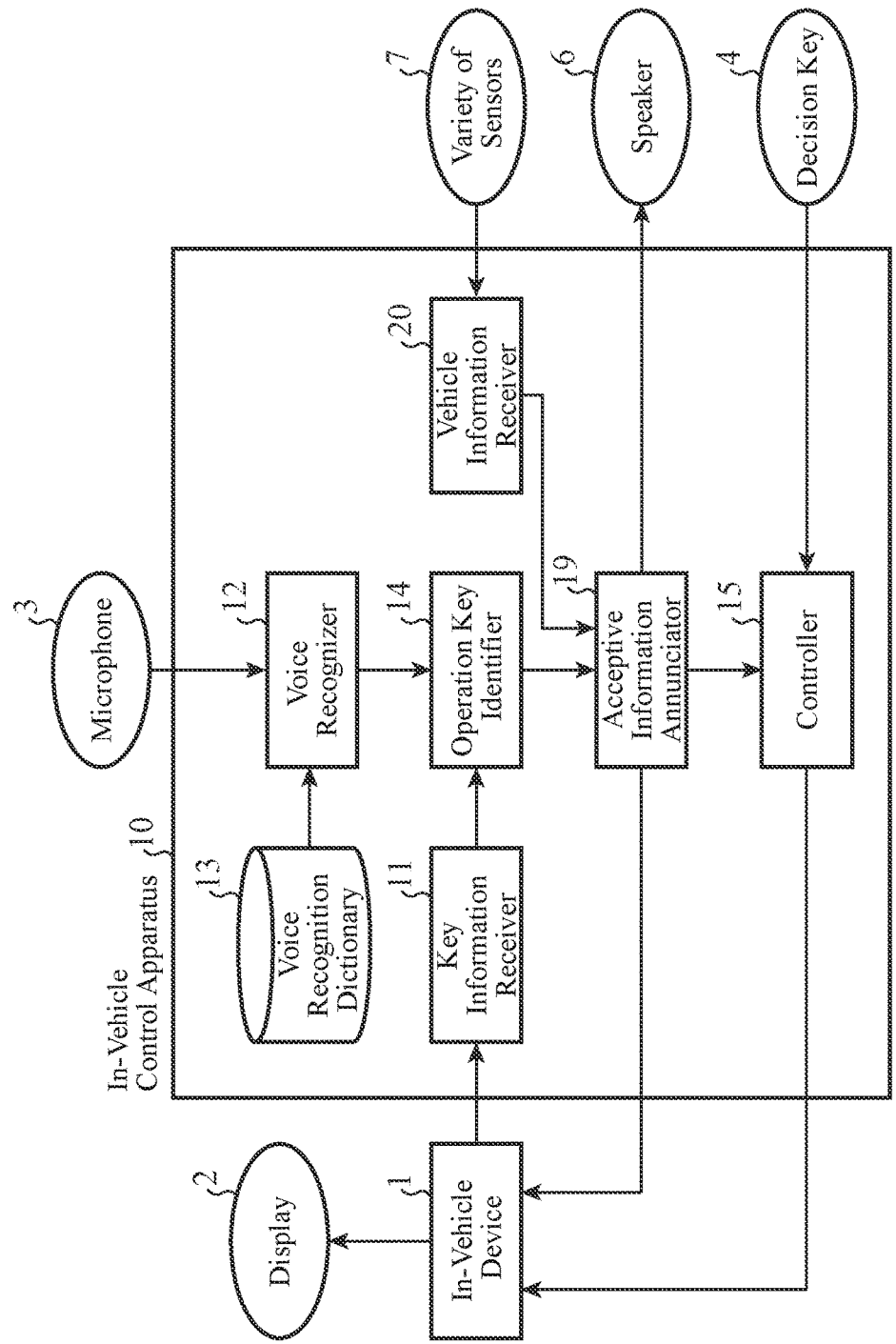
FIG. 11 is a block diagram showing another example of the in-vehicle control apparatus according to Embodiment 2.

Further, it is allowable that, as shown in FIG. 11, the in-vehicle control apparatus 10 further includes a vehicle information receiver 20 that acquires information of the vehicle, so that the acceptive information annunciator 19 changes the method of making announcement about the identified key, according to the vehicle information, such as a vehicle speed, a steering angle of the steering wheel and the like, acquired from a variety of sensors 7 by the vehicle information receiver 20.

For example, in such a case of particularly clearly informing the user of the identified operation key as described above, it is conceivable that: when the traveling speed of the vehicle is less than a predetermined specific value, it is judged that the user has allowance to watch the screen, so that, upon placing weight on comfortableness, the annunciator instructs the display 2 to make a screen-display based announcement that requires no time for communicating announcement information, as shown, for example, at FIG. 10 (b); whereas, when the speed is equal to or more than the specific value, upon placing weight on safety, the annunciator instructs the speaker 6 to make a sound-based announcement (voice guidance, etc.) that requires no screen watching; or likewise.

Then, the controller 15, when detects pressing-down of the single decision key 4 connected to the in-vehicle control apparatus 10 (in the case of YES in Step ST16), transmits the execution command sent from the operation key identifier 14, to the in-vehicle device 1 connected to the in-vehicle control apparatus 10 (Step ST17), so that the in-vehicle device 1 executes the corresponding function.

When thus configured, as exemplified by the case where, at the time of stopping of the vehicle, the announcement is made by screen displaying, making it possible to lightly perform the operation, whereas at the time of traveling, the announcement is made by voice outputting, making it possible to safely perform the operation, it is possible to make the announcement about the identified operation key to the user in such a manner that when the driving load of the user is low, weight is placed on comfortableness, whereas when the driving load of the user is high, weight is placed on safety. This makes it possible for the user to make the operation in a safe and comfortable manner in conformity to the driving condition, so that the degree of inconvenience on the operation can be improved.

Note that it is assumed that the vehicle information herein also includes road information, such as a width or a degree of bend (degree of linearity) of the road on which the vehicle travels, clock time information during traveling, and the like. Thus, when the method of making the announcement is so designed that it is changed not only due to a difference between the time of stopping of the vehicle and the time of traveling, but also depending on the vehicle speed, or when the method of making the announcement is so designed that it is changed in such a manner that the threshold value of the above vehicle speed is varied depending on a traveling location, the road information, the clock time, etc., the user can perform the operation in a more safe and comfortable manner for him/her.

Further, though omitted from the diagram, it is allowable to configure so that the position of the host vehicle during traveling or the information of the width of the road can be acquired from the information in the connected navigation device (in-vehicle device 1) or the like, to thereby vary a specified value (threshold value) of the traveling speed depending on easiness of traveling.

Embodiment 3

Figure 12:
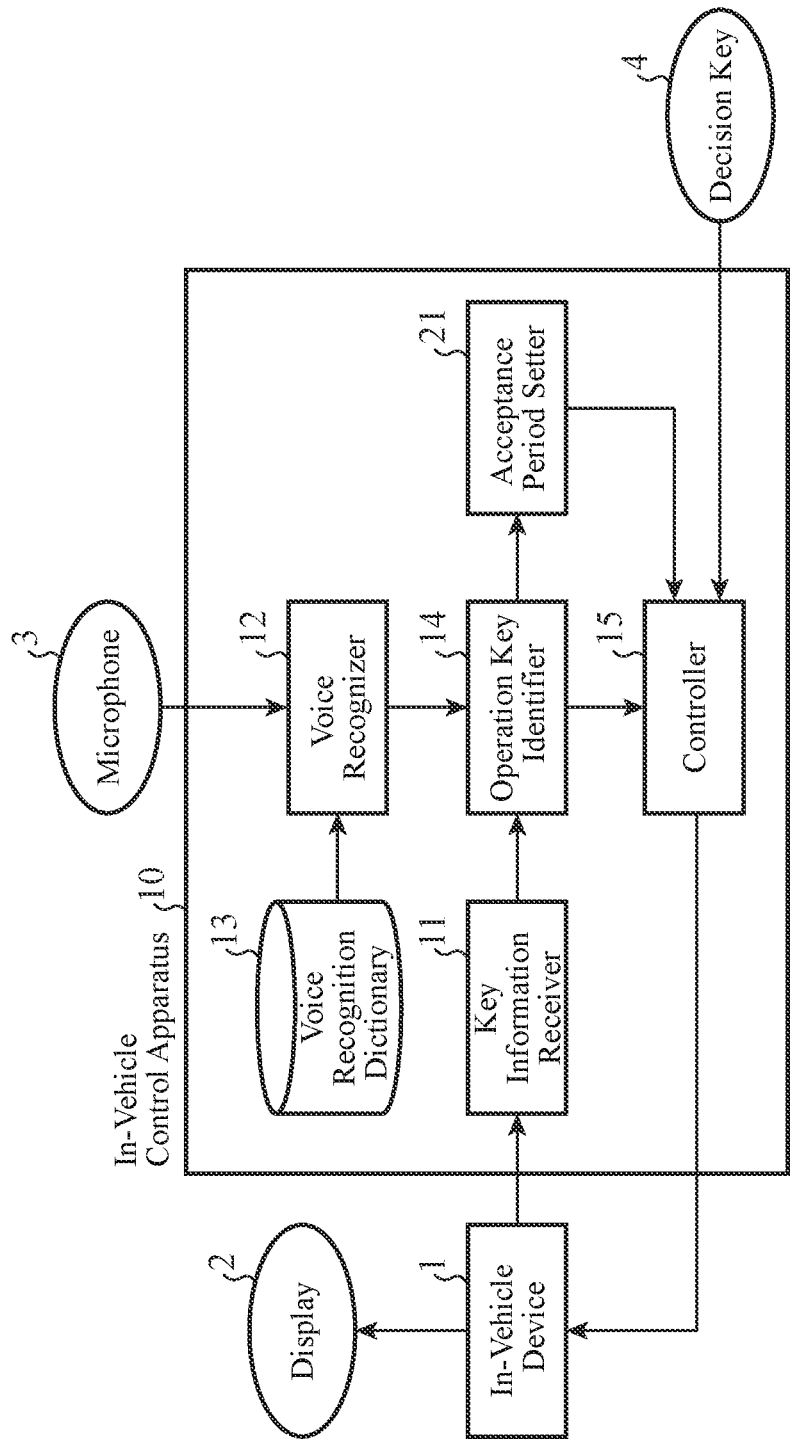
FIG. 12 is a block diagram showing an example of an in-vehicle control apparatus according to Embodiment 3.

FIG. 12 is a block diagram showing an example of an in-vehicle control apparatus according to Embodiment 3 of the invention. Note that, with respect to the components equivalent to those described in Embodiments 1 and 2, the same reference numerals are given thereto, so that duplicated description thereof is omitted.

In comparison to Embodiment 1, according to the in-vehicle control apparatus 10 of Embodiment 3 shown below, it further includes an acceptance period setter 21, so as to be configured to set a period (acceptance period) in which the instruction for execution of the function assigned to the operation key identified by the operation key identifier 14 is acceptable, and the controller 15 is configured to accept the instruction for execution only in the acceptance period set by the acceptance period setter 21.

Next, operations of the thus-configured in-vehicle control apparatus 10 according to Embodiment 3 will be described.

Figure 13:
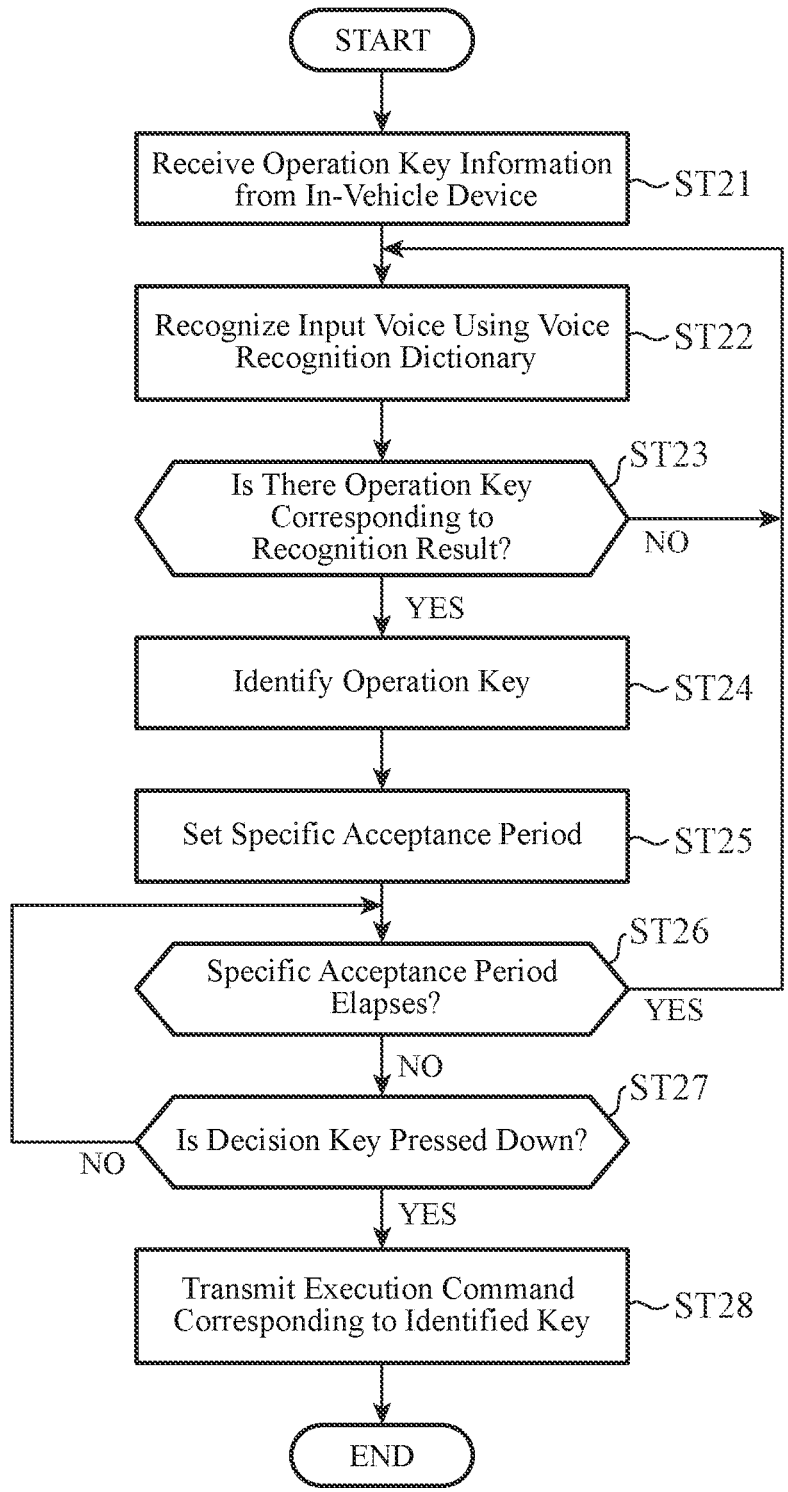
FIG. 13 is a flowchart showing operations of the in-vehicle control apparatus according to Embodiment 3.

FIG. 13 is a flowchart showing operations of the in-vehicle control apparatus 10 according to Embodiment 3. Even here, it is presumed, like Embodiments 1 and 2, that the in-vehicle device 1 to be connected is an audio-integrated car-navigation device.

The processing until the operation key is identified by the operation key identifier 14 (Steps ST21 to ST24) is the same as that in Steps ST1 to ST4 in the flowchart shown in FIG. 2 in Embodiment 1, so that its description is omitted here.

According to Embodiment 3, after the operation key identifier 14 identifies the operation key in Step ST24, the acceptance period setter 21 sets, upon receiving the identification result of the operation key by the operation key identifier 14, a predetermined specific acceptance period, for example, 10 seconds (Step ST25).

If the time is within the specific acceptance period (here, 10 seconds) after the operation key is identified (in the case of NO in Step ST26), like Embodiment 1, the controller 15 waits to pressing-down of the decision key by the user. In contrast, if pressing-down of the decision key by the user is not detected even when the specific acceptance period (10 seconds) elapses after the operation key is identified (in the case of NO in Step ST27 and YES is given in Step ST26), the flow returns to Step ST22, so that the voice recognition processing is performed again by the voice recognizer 12.

Then, the controller 15, when detects pressing-down of the single decision key 4 connected to the in-vehicle control apparatus 10 (in the case of YES in Step ST27), transmits the execution command sent from the operation key identifier 14, to the in-vehicle device 1 connected to the in-vehicle control apparatus 10 (Step ST28), so that the in-vehicle device 1 executes the corresponding function.

As described above, according to Embodiment 3, after the operation key is identified, when the acceptance period elapses until the decision key is pressed down, the recognized word is cancelled, so that it is possible to reduce the possibility of causing the operation not intended by the user in the case of false recognition. Further, even in such a case where, due to concentrating on driving, the user has forgotten what the identified operation key is, it is allowed to re-try from voice recognition by speaking again after the elapse of the acceptance period, so that comfortableness on the user's operation can be improved.

Figure 14:
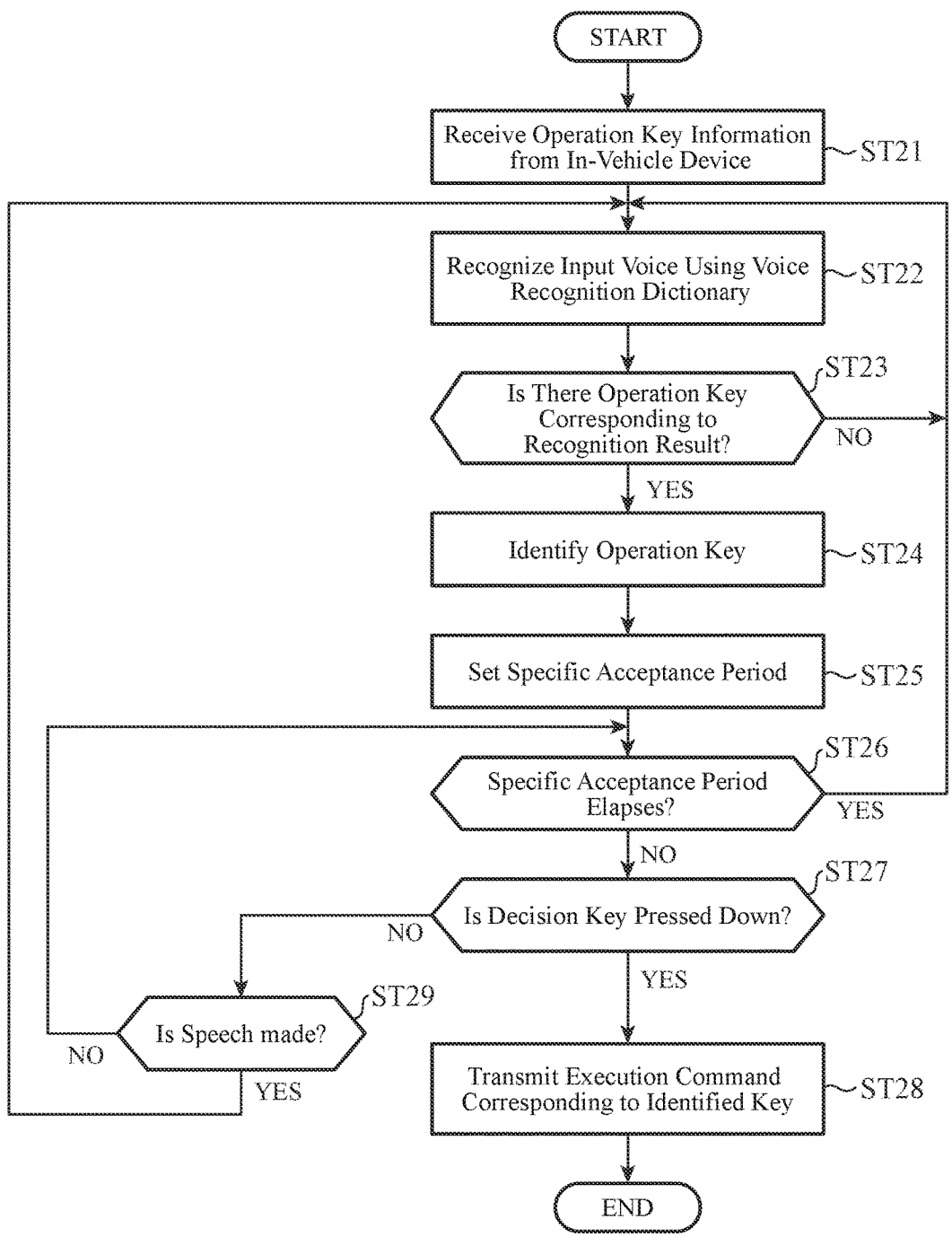
FIG. 14 is another example of flowchart showing operations of the in-vehicle control apparatus according to Embodiment 3.

Further, as shown in FIG. 14, it is allowable that, after the specific acceptance period is set in Step ST25, the voice recognizer 12 still operates in that acceptance period, so that, at every time a change occurs in the voice recognition result by the voice recognizer 12, the operation key identifier 14 re-identifies an operation key on the basis of the voice recognition result after that change.

Namely, in the case where a speech is made by the user (the user speaks again) within the specific acceptance period (for example, 10 seconds) after the operation key is identified, but before the decision key is pressed down by the user (in the case of NO both in Steps ST26 and ST27, and YES in Step ST29), the flow returns to Step ST22, so that the voice recognition processing is performed again by the voice recognizer 12.

When thus configured, in such a case where, although the operation key has been identified, another operation key is wanted to be re-selected, or where the operation key has not been properly identified, it is allowed to easily correct such false recognition by a retry of speaking even if the specific period has not elapsed, so that comfortableness on the user's operation can be improved.

Figure 15:
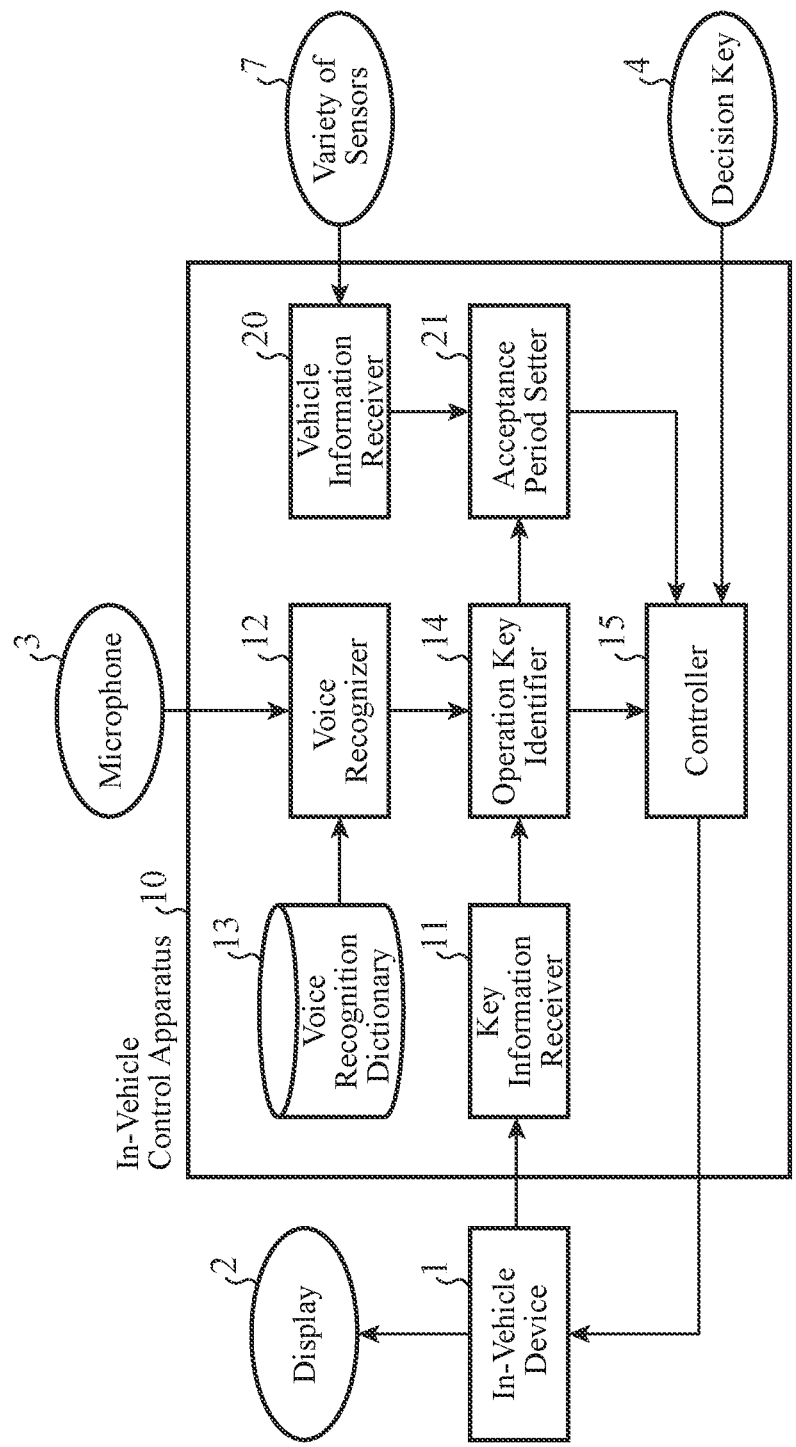
FIG. 15 is a block diagram showing another example of the in-vehicle control apparatus according to Embodiment 3.

Further, as shown in FIG. 15, it is allowable that the in-vehicle control apparatus 10 further includes a vehicle information receiver 20 that acquires information of the vehicle, so that the acceptance period setter 21 changes the acceptance period (makes it variable) according to the vehicle information, such as a vehicle speed, a steering angle of the steering wheel or the like, acquired from a variety of sensors (vehicle speed sensor, etc.) 7 by the vehicle information receiver 20. Note that it is assumed that the vehicle information herein also includes road information, such as a width or a degree of bend (degree of linearity) of the road on which the vehicle travels, and the like.

For example, at the time of traveling at high speed or in the case of turning left/right at an intersection, it is judged to be difficult for the user to press down the decision key because the driving load is high, so that the acceptance period is set longer, whereas when there is a low frequency of handling the steering wheel and thus a straight line continues for a while, it is judged to be easy for the user to press down the decision key because the driving load is low, so that the acceptance period is set shorter.

When thus configured, an adequate acceptance period is to be set according to the user's allowance depending on the driving load, so that it is possible to reduce such troublesomeness in the operation that, when the user has no allowance, he/she cannot give the instruction for execution in the acceptance period and thus has to cause the voice recognition once again for operation, and that there is a possibility of causing operation not intended by the user in the case of false recognition.

Further, though omitted from the diagram, it is allowable to configure so that the position of the host vehicle during traveling or the information of the width of the road can be acquired from the information in the connected navigation device (in-vehicle device 1) or the like, to thereby change the acceptance period depending on easiness of traveling.

Embodiment 4

Figure 16:
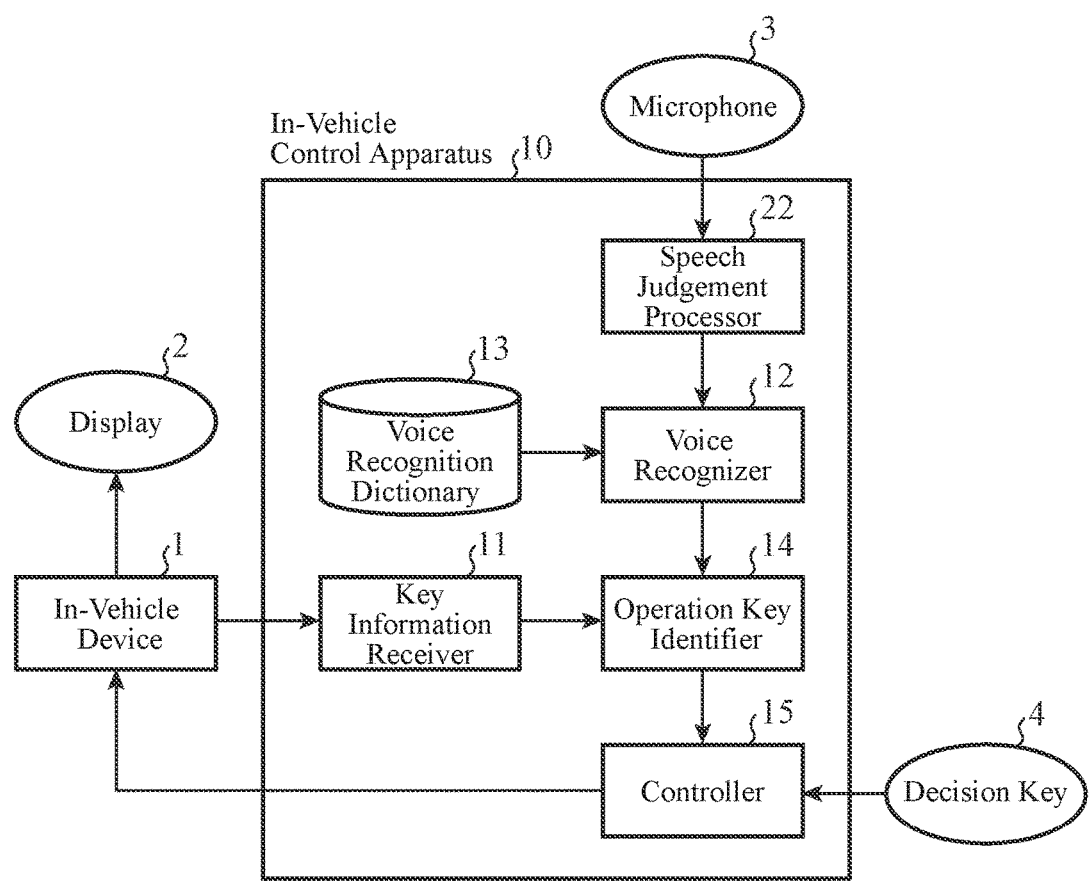
FIG. 16 is a block diagram showing an example of an in-vehicle control apparatus according to Embodiment 4.

FIG. 16 is a block diagram showing an example of an in-vehicle control apparatus according to Embodiment 4 of the invention. Note that, with respect to the components equivalent to those described in Embodiments 1 to 3, the same reference numerals are given thereto, so that duplicated description thereof is omitted.

In comparison to Embodiment 1, according to the in-vehicle control apparatus 10 of Embodiment 4 shown below, it further includes a speech judgement processor 22 that judges whether or not the input voice through the microphone 3 (the voice spoken by the user) is a speech intended to cause an operation, so that the voice recognizer 12 performs voice recognition only about the speech which is the input voice (the spoken voice) that is judged to be a speech intended to cause an operation, by the speech judgment processor 22.

For speech-state judgement processing (processing to judge whether or not the speech is intended to cause an operation) in the speech judgement processor 22, it suffices to use an aforementioned Hidden Markov Model that is used in voice recognition, and, for example, when a laughter, a cough, a sneeze and at least one acoustic feature in the conversation among plural persons, are learned beforehand each as a speech not intended to cause an operation, it is possible to recognize the input voice that is not a speech intended to cause an operation, to thereby judge whether or not it is a speech intended to cause an operation.

Meanwhile, though omitted from the diagram, in the case of in-vehicle application, because there is no case where the positions of the users riding in the vehicle change frequently, when plural microphones are arranged therein, it is possible to judge whether it is a conversation among such plural persons or not, from a power ratio or a variation in phase difference of the input signals of the respective microphones. Thus, in the case of a conversation among such plural persons, it is possible to judge that the speech is not a speech intended to cause an operation. Further, in the case where the driver is only the objective person for operation, it is possible to judge that the voice reaching from a direction other than that of the driver's seat position is a speech not intended to cause an operation.

Next, operations of the thus-configured in-vehicle control apparatus 10 according to Embodiment 4 will be described.

Figure 17:
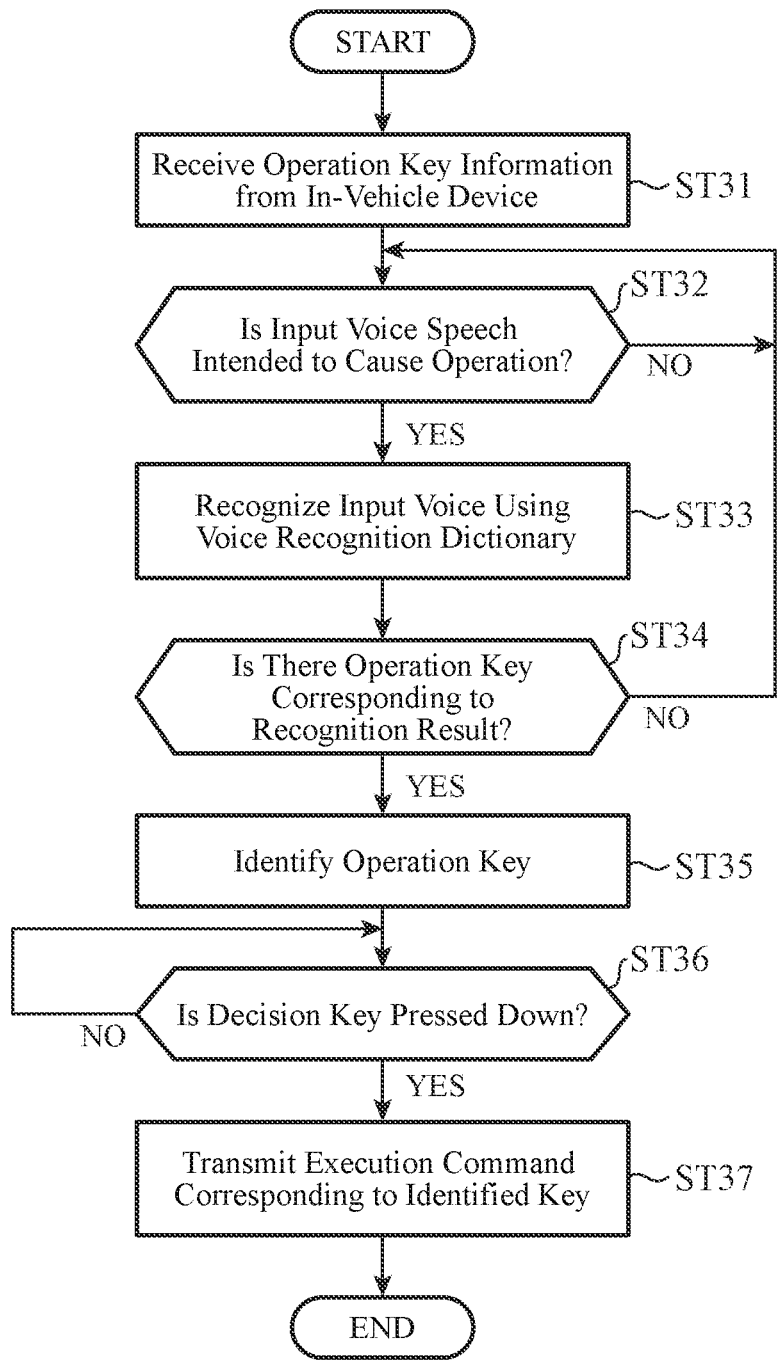
FIG. 17 is a flowchart showing operations of the in-vehicle control apparatus according to Embodiment 4.

FIG. 17 is a flowchart showing operations of the in-vehicle control apparatus 10 according to Embodiment 4. Even here, it is presumed, like Embodiments 1 to 3, that the in-vehicle device 1 to be connected is an audio-integrated car-navigation device.

First, the key information receiver 11 receives from the car-navigation device (in-vehicle device 1) connected thereto, the information of the operation keys displayed on the display 2 (Step ST31).

Then, the speech judgement processor 22 judges from the input voice through the microphone 3, whether or not it is a speech intended to cause an operation, using the aforementioned method, for example (Step ST32).

Then, when it is judged that the input voice through the microphone 3 is not a speech intended to cause an operation (in the case of NO in Step ST32), the speech judgement processor keeps waiting until a voice that is to be judged as a speech intended to cause an operation is inputted. Namely, when judged that it is not a speech intended to cause an operation, the input voice is rejected before the voice recognition processing is performed.

In contrast, when judged that it is a speech intended to cause an operation (in the case of YES in Step ST32), the voice recognizer 12, upon receiving the result of judgement about the state of speech by the speech judgement processor 22, performs voice recognition processing (Step ST33). Namely, the voice recognition processing is performed only when judged to be a speech intended to cause an operation in Step ST32.

Next, using the recognition keyword acquired from the voice recognizer 12, the operation key identifier 14 refers to the operation key information acquired from the key information receiver 11, to thereby judge whether the operation key corresponding to the voice recognition result is present or not (Step ST34).

Then, if the operation key corresponding to the voice recognition result (recognition keyword) is not present in the operation key information, so that no operation key is identified (in the case of NO in Step ST34), the flow returns to Step ST32, so that the speech-state judgement processing is performed again by the speech judgement processor 22.

In contrast, if the operation key corresponding to the voice recognition result is present, so that the operation key is identified, namely, if the operation key matched to the recognition keyword is present (in the case of YES in Step ST34), the subsequent processing (Steps ST35 to ST37) is the same as that in Steps ST4 to ST6 shown in the flowchart in FIG. 2 in Embodiment 1, so that its description is omitted here.

As described above, according to Embodiment 4, because a speech irrelevant to an operation can be eliminated before voice recognition, it is possible to reduce the frequency of occurrence of false recognition in the voice recognition processing and to reduce occurrence of execution about an unintended operation key, so that user's comfortableness in the operation can be improved.

Embodiment 5

Figure 18:
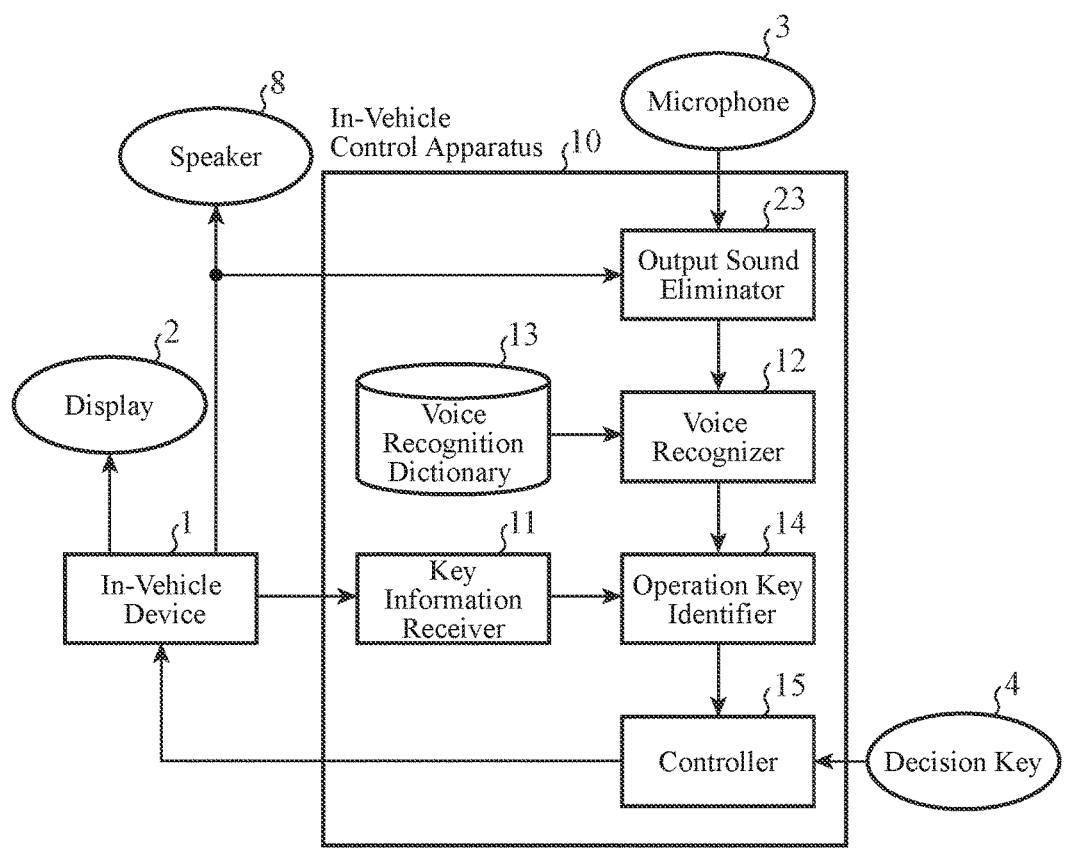
FIG. 18 is a block diagram showing an example of an in-vehicle control apparatus according to Embodiment 5.

FIG. 18 is a block diagram showing an example of an in-vehicle control apparatus according to Embodiment 5 of the invention. Note that, with respect to the components equivalent to those described in Embodiments 1 to 4, the same reference numerals are given thereto, so that duplicated description thereof is omitted.

In comparison to Embodiment 1, according to the in-vehicle control apparatus 10 of Embodiment 5 shown below, it further includes an output sound eliminator 23 that acquires a signal of speaker-output sound that is outputted from the in-vehicle device 1 to a speaker 8 connected to the in-vehicle device 1, to thereby eliminate from the input sound, a component of the speaker-output sound, so that the voice recognizer 12 performs voice recognition with respect to the voice after elimination of the component of the speaker-output sound by the output sound eliminator 23.

The elimination method of the output sound in the output sound eliminator 23 may be performed, for example, using typical signals of speaker-output sound and microphone-input sound, and employing an adaptive filter whose filter coefficient is calculated by a learning identification method. When thus configured, it is possible to estimate an acoustic echo component in the speaker-output sound that is inputted to the microphone in the applied acoustic environment, so that an influence of the signal of speaker-output sound on the voice recognition accuracy can be reduced by deducting that acoustic echo component from the voice signal inputted to the microphone.

Next, operations of the thus-configured in-vehicle control apparatus 10 according to Embodiment 5 will be described.

Figure 19:
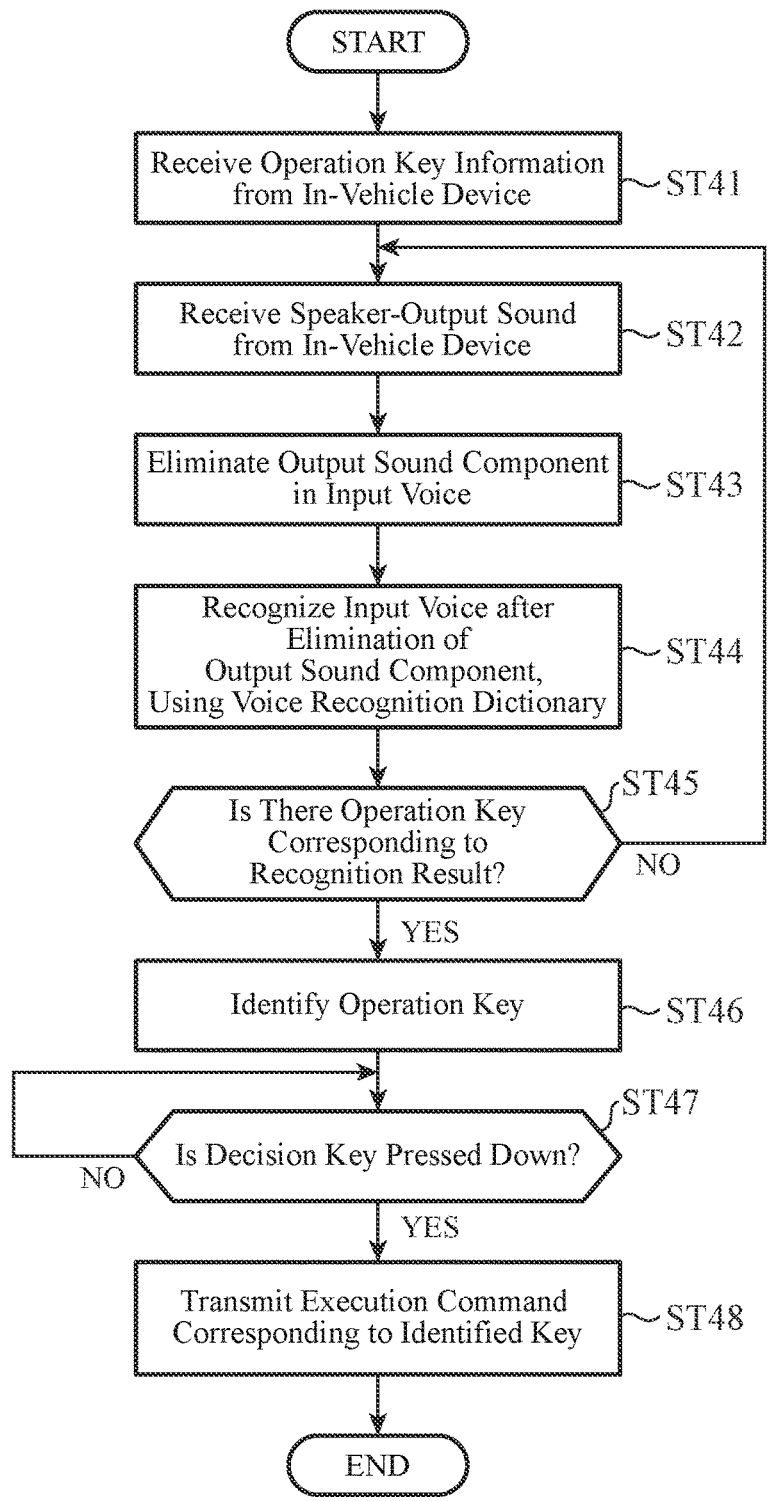
FIG. 19 is a flowchart showing operations of the in-vehicle control apparatus according to Embodiment 5.

FIG. 19 is a flowchart showing operations of the in-vehicle control apparatus 10 according to Embodiment 5. Even here, it is presumed, like Embodiments 1 to 4, that the in-vehicle device 1 to be connected is an audio-integrated car-navigation device.

First, the key information receiver 11 receives from the car-navigation device (in-vehicle device 1) connected thereto, the information of the operation keys displayed on the display 2 (Step ST41).

Then, the output sound eliminator 23 receives a signal of speaker-output sound transmitted from the in-vehicle device 1 to the speaker 8 (Step ST42), and using the signal of speaker-output sound and a voice signal inputted through the microphone, eliminates from the voice inputted through the microphone, the acoustic echo component (output sound component) in the sound that is outputted through the speaker (Step ST43).

Then, the voice recognizer 12 performs voice recognition processing on the input voice after elimination of the speaker-output sound by the output sound eliminator 23 (Step ST44).

The processing subsequent to the voice recognition processing (Steps ST45 to ST48) is the same as that in Steps ST3 to ST6 in the flowchart shown in FIG. 2 in Embodiment 1, so that its description is omitted here.

Note that in the aforementioned Embodiment 5, the signal of speaker-output sound from the connected in-vehicle device 1 is eliminated; however, it is allowable to also receive and eliminate together a signal of sound outputted from the in-vehicle control apparatus 10 itself or another device, or from the vehicle, etc. on which the in-vehicle control apparatus 10 is mounted.

As described above, according to Embodiment 5, it is configured so that the acoustic echo component in the speaker-output sound can be eliminated from the voice inputted through the microphone, even during playing a vehicle voice guidance/sound effect or during playing back music. Thus, it is possible to reduce false recognition to thereby perform voice recognition more highly accurately, so that user's comfortableness in the operation can be improved.

Embodiment 6

Figure 20:
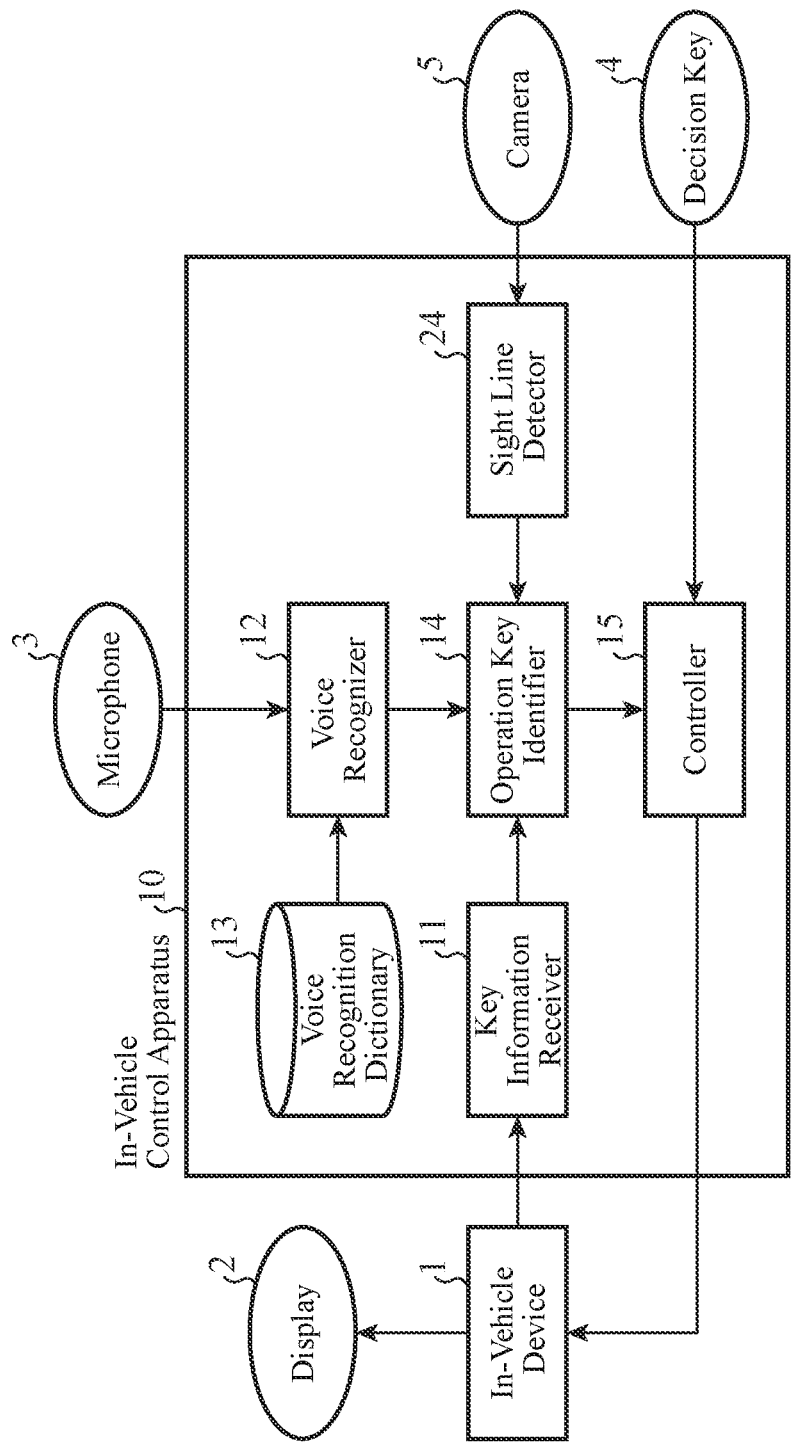
FIG. 20 is a block diagram showing an example of an in-vehicle control apparatus according to Embodiment 6.

FIG. 20 is a block diagram showing an example of an in-vehicle control apparatus according to Embodiment 6 of the invention. Note that, with respect to the components equivalent to those described in Embodiments 1 to 5, the same reference numerals are given thereto, so that duplicated description thereof is omitted.

In comparison to Embodiment 1, according to the in-vehicle control apparatus 10 of Embodiment 6 shown below, it further includes a sight line detector 24 that detects a sight line of the user, so that the operation key identifier 14 identifies the operation key using sight line information detected by the sight line detector 24 and the recognition result by the voice recognizer 12.

The sigh line detector 24 detects the sight line of the user and then transmits coordinate information of that sight line to the operation key identifier 14.

Detection processing of the sight line by the sight line detector 24 may be performed, for example, by roughly estimating it from a face direction using a typical pattern recognition based on an image of the user's face captured by the camera 5, or by using, though omitted from the diagram, a corneal reflection method by source-light irradiation, or the like. Further, when it is configured to acquire beforehand, information of the relative positional relationship between the display 2 and the user's eyes, it is possible to acquire as coordinate values, what portion in the display 2 the user is viewing.

Next, operations of the thus-configured in-vehicle control apparatus 10 according to Embodiment 6 will be described.

FIG. 21 is a flowchart showing operations of the in-vehicle control apparatus 10 according to Embodiment 6. Even here, it is presumed, like Embodiments 1 to 5, that the in-vehicle device 1 to be connected is an audio-integrated car-navigation device.

First, the key information receiver 11 receives from the car-navigation device (in-vehicle device 1) connected thereto, the information of the operation keys displayed on the display 2 (Step ST51).

The operation key information received herein includes, as shown in FIG. 22, in addition to the recognition keywords and the execution commands corresponding to the respective operation keys, the coordinate information on the display 2 of the respective operation keys displayed thereon, for example, (x, y)=(100, 100), and the like. The coordinate information may be any information so far as it makes it possible to uniquely determine each of the display positions, such as, for example, an upper-left coordinate or center coordinate of the operation key, and additionally, information whereby the size can be known may be added thereto.

Then, using, for example, the aforementioned method, the sight line detector 24 detects the direction of the sight line of the user from the camera image captured by the camera 5; acquires the coordinate information (hereinafter, referred to as sight-line coordinate) on the display screen of the display 2, corresponding to a portion to which the user directs the sight line, for example, (x, y)=(200, 200); and sends it to the operation key identifier 14 (Step ST52).

Meanwhile, the voice recognizer 12 performs voice recognition from the voice signal inputted through the microphone 3 using the voice recognition dictionary 13, and outputs the recognition keyword included in the speech (Step ST53).

Then, based on the sight-line coordinate received from the sight line detector 24 in Step ST52, the voice recognition result recognized in Step ST53 and the operation key information received in Step ST51, the operation key identifier 14 judges whether the operation key corresponding to the direction of the sight line and to the voice recognition result is present or not (Step ST54) and, if the operation key corresponding to the direction of the sight line and to the voice recognition result is present (in the case of YES in Step ST54), identifies the operation key corresponding to the voice recognition result (Step ST55).

Specifically, a predetermined specific range, for example, ±100, from the sight-line coordinate of (x, y)=(200, 200) received from the sight line detector 24, namely, a range from the coordinate of (x, y)=(100, 100) to that of (x, y)=(300, 300) is presumed as a visually recognizable range.

Then, based on the coordinate information of the operation keys added to the information of the operation keys received by the key information receiver 11, the operation key corresponding to the voice recognition result is identified with reference to operation key information of the operation keys that are present in the visually recognizable range; namely, in the case where the information of the operation keys is that shown in FIG. 22, with reference to operation key information of only the operation keys of

[Playback] and [Next Song], because [Playback] having a coordinate of (x, y)=(100, 100) and [Next Song] having a coordinate of (x, y)=(100, 300) are only the operation keys that are present in the visually recognizable range.

In contrast, if the operation key corresponding to the voice recognition result (recognition keyword) is not present in the information of the operation keys present in the visually recognizable range (in the case of NO in Step ST54), the flow returns to Step ST52, so that the sight line detection by the sight line detector 24 and the voice recognition processing by the voice recognizer 12 are performed again.

Here, the processing (Steps ST56 to ST57) subsequent to the operation key identification in Step ST55 is the same as that in Steps ST5 to ST6 in the flowchart shown in FIG. 2 in Embodiment 1, so that its description is omitted.

Note that, in the case where plural in-vehicle devices are connected, the direction of the sight line obtained by the sight line detector 24 may be utilized so as to limit the device to be operated.

Further, though omitted from the diagram, it is allowable, like Embodiment 1, to further include a dictionary generator 16 (see, FIG. 6) to thereby generate, using the coordinate positions added to the operation key information and the sight-line coordinate acquired by the sight line detector 24, a voice recognition dictionary so that the voice recognition is performed in a limited manner only about the operation keys included in a specific visually recognizable range.

When thus configured, the voice recognition objects can be limited to the recognition keywords corresponding to the keys that the user is likely to operate, in such a manner that, from the displayed operation keys, they are narrowed down to those around a portion that the user is viewing, to thereby identify the operation key in a limited manner from around the narrowed down portion. Thus, it is possible to enhance an accuracy or response speed in voice recognition. This achieves a particular effect, for example, in the case where the display screen of the display 2 is large or the case where there are plural screens (plural displays).

As described above, according to Embodiment 6, because of the sight line detection, it becomes possible to estimate the keys that the user is likely to operate, to thereby reduce identification of an operation key different to the speech. Thus, it is possible to reduce occurrence of execution about an unintended operation key, so that user's comfortableness in the operation can be improved.

It should be noted that unlimited combination of the respective embodiments, modification of any configuration element in the embodiments and omission of any configuration element in the embodiments may be made in the present invention without departing from the scope of the invention.

INDUSTRIAL APPLICABILITY

The in-vehicle control apparatus of the invention may be applied to any in-vehicle device so far as it is associated with displaying and operation, such as a display having an operation control function, a device having the display, a device connected to the display, or the like, as exemplified by a car-navigation device, an HUD (Head-Up Display), an instrument panel and the like. Further, the in-vehicle control apparatus may itself be incorporated in such a device.

DESCRIPTION OF REFERENCE NUMERALS AND SIGNS

1: in-vehicle device, 2: display, 3: microphone, 4: decision key, 5: camera, 6, 8: speaker, 7: variety of sensors, 10: in-vehicle control apparatus, 11: key information receiver, 12: voice recognizer, 13, 17: voice recognition dictionary, 14: operation key identifier, 15: controller, 16: dictionary generator, 18: motion recognizer, 19: acceptive information annunciator, 20: vehicle information receiver, 21: acceptance period setter, 22: speech judgement processor, 23: output sound eliminator, 24: sight line detector, 30: speech (spoken content), 40: highlighted indication.

The invention claimed is:

1. An in-vehicle control apparatus for controlling an in-vehicle device mounted on a vehicle, comprising:
   a key information receiver that receives information of a plurality of operation keys displayed on a display connected to the in-vehicle device, dynamically in response to a change in display content displayed on the display;
   a voice recognizer that recognizes a voice spoken by a user, using a voice recognition dictionary;
   an operation key identifier that identifies the operation key corresponding to the voice spoken by the user, on the basis of the information of the operation keys received by the key information receiver and a voice recognition result by the voice recognizer;
   a controller that receives from a decision key, an output for selecting the operation key identified by the operation key identifier, to thereby give an instruction to the in-vehicle device for causing it to execute a function assigned to the thus-identified operation key;
   an acceptance period setter that sets an acceptance period in which the instruction for execution of the function assigned to the operation key identified by the operation key identifier is acceptable; and
   a vehicle information receiver that acquires information of the vehicle,
   wherein the acceptance period setter changes the acceptance period according to the vehicle information acquired by the vehicle information receiver,
   wherein the controller accepts the instruction for execution only in the acceptance period set by the acceptance period setter, and
   wherein the voice recognizer still operates in the acceptance period, and
   wherein the operation key identifier identifies again the operation key at every occurrence of a change in the voice recognition result by the voice recognizer, on the basis of the voice recognition result after that change.

2. The in-vehicle control apparatus of claim 1, further comprising a dictionary generator that generates the voice recognition dictionary at least from words corresponding to the operation keys displayed on the display, on the basis of the information of the operation keys,
   wherein the voice recognizer recognizes the voice spoken by the user, using the voice recognition dictionary generated by the dictionary generator.

3. The in-vehicle control apparatus of claim 1, further comprising an acceptive information annunciator that makes an announcement, based on an identification result of the operation key by the operation key identifier, about at least one of: a fact of starting to accept the instruction for execution with respect to the identified operation key; a fact of continuing to accept the instruction for execution with respect to the identified operation key; and the information of the identified operation key.

4. The in-vehicle control apparatus of claim 3, further comprising a vehicle information receiver that acquires information of the vehicle, wherein the acceptive information annunciator changes a method of making said announcement according to the vehicle information acquired by the vehicle information receiver.

5. The in-vehicle control apparatus of claim 1, further comprising a speech judgement processor that judges whether or not the voice spoken by the user is a speech intended to cause an operation, wherein the voice recognizer performs voice recognition only when the voice thus-spoken is judged to be a speech intended to cause an operation, by the speech judgement processor.

6. The in-vehicle control apparatus of claim 1, further comprising a motion recognizer that recognizes a body motion of the user, wherein the controller gives the instruction for causing execution of the function assigned to the identified operation key, when a body motion of the user that shows an intention to cause execution is recognized by the motion recognizer.

7. The in-vehicle control apparatus of claim 1, further comprising an output sound eliminator that acquires a signal of output sound outputted from the in-vehicle device to thereby eliminate a component of the output sound from an input sound, wherein the voice recognizer performs voice recognition with respect to the voice after elimination of the component of the output sound by the output sound eliminator.

8. The in-vehicle control apparatus of claim 1, further comprising a sight line detector that detects a sight line of the user to thereby transmit coordinate information of the sight line to the operation key identifier;

wherein the key information receiver receives also as the information of the operation keys, coordinate information on the display on which the respective operation keys are displayed; and wherein the operation key identifier identifies the operation key on the basis of the coordinate information of the sight line received from the sight line detector, the recognition result by the voice recognizer, and the information of the operation keys received by the key information receiver.

9. An in-vehicle control method for controlling an in-vehicle device mounted on a vehicle, comprising:

in a key information receiver, receiving information of a plurality of operation keys displayed on a display connected to the in-vehicle device, dynamically in response to a change in display content displayed on the display;

in a voice recognizer, recognizing a voice spoken by a user, using a voice recognition dictionary;

in an operation key identifier, identifying the operation key corresponding to the voice spoken by the user, on the basis of the information of the operation keys received by the key information receiver and a voice recognition result by the voice recognizer;

in a controller, receiving from a decision key, an output for selecting the operation key identified by the operation key identifier, to thereby give an instruction to the in-vehicle device for causing it to execute a function assigned to the thus-identified operation key;

in an acceptance period setter, setting an acceptance period in which the instruction for execution of the function assigned to the operation key identified in the identifying step is acceptable; and in a vehicle information receiver, acquiring information of the vehicle, wherein in the acceptance period setter, changing the acceptance period according to the vehicle information acquired by the vehicle information receiver, in the controller, accepting the instruction for execution only in the acceptance period set in the setting step, in the voice recognizer, operating in the acceptance period, and in the operation key identifier, identifying again the operation key at every occurrence of a change in the voice recognition result, on the basis of the voice recognition result after that change.

* * * * *